(12) United States Patent
Svendsen et al.

(10) Patent No.: US 10,277,939 B2
(45) Date of Patent: *Apr. 30, 2019

(54) SYSTEM AND DEVICE FOR INTERACTING WITH A REMOTE PRESENTATION

(71) Applicant: IP3 2018, SERIES 300 OF ALLIED SECURITY TRUST I, San Francisco, CA (US)

(72) Inventors: Hugh Blake Svendsen, Chapel Hill, NC (US); Eugene Farrelly, Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,329

(22) Filed: Nov. 27, 2017

(65) Prior Publication Data

US 2018/0084297 A1 Mar. 22, 2018

Related U.S. Application Data

(63) Continuation of application No. 15/186,743, filed on Jun. 20, 2016, now Pat. No. 9,872,061.

(60) Provisional application No. 62/182,461, filed on Jun. 20, 2015.

(51) Int. Cl.
| | | |
|---|---|---|
| *H04N 7/18* | (2006.01) |
| *G06F 3/00* | (2006.01) |
| *G06F 13/00* | (2006.01) |
| *H04N 5/445* | (2011.01) |
| *H04N 21/422* | (2011.01) |
| *H04N 21/214* | (2011.01) |
| *H04N 21/41* | (2011.01) |
| *H04N 21/63* | (2011.01) |
| *H04N 21/475* | (2011.01) |
| *H04N 21/2347* | (2011.01) |
| *H04N 7/15* | (2006.01) |
| *H04N 21/4367* | (2011.01) |

(52) U.S. Cl.
CPC ......... *H04N 21/42204* (2013.01); *H04N 7/15* (2013.01); *H04N 21/2143* (2013.01); *H04N 21/2347* (2013.01); *H04N 21/4126* (2013.01); *H04N 21/4367* (2013.01); *H04N 21/4751* (2013.01); *H04N 21/632* (2013.01)

(58) Field of Classification Search
None
See application file for complete search history.

(56) References Cited

U.S. PATENT DOCUMENTS

| | | |
|---|---|---|
| 7,028,253 B1 | 4/2006 | Lieberman et al. |
| 7,953,690 B2 | 5/2011 | Luo et al. |
| 8,144,944 B2 | 3/2012 | Ishii |

(Continued)

OTHER PUBLICATIONS

Facebook Moments Help Center, Facebook, Jan. 7, 2017, 7 pages.

(Continued)

*Primary Examiner* — William J Kim
(74) *Attorney, Agent, or Firm* — John Maldjian; Maldjian Law Group LLC

(57) ABSTRACT

The present disclosure relates to sharing images over a network. Images obtained from a second device are presented at a first device, and shared with a plurality of third devices. The third devices are able to obtain and store images from the first device, modify the contents of a presentation, and control the rendering of the presentation. The proposed system allows for instantaneous sharing without the need to set up accounts a-priori, uploading only the images that are requested for sharing, and does not require invitations or privacy settings.

33 Claims, 21 Drawing Sheets

(56) References Cited

U.S. PATENT DOCUMENTS

| | | |
|---|---|---|
| 8,195,665 B1 | 6/2012 | Mayle et al. |
| 8,284,990 B2 | 10/2012 | Ma et al. |
| 8,341,145 B2 | 12/2012 | Dodson et al. |
| 8,402,094 B2 | 3/2013 | Bosworth et al. |
| 8,510,383 B2 | 8/2013 | Hurley et al. |
| 8,612,533 B1 | 12/2013 | Harris et al. |
| 8,630,494 B1 | 1/2014 | Svendsen |
| 8,731,819 B2 | 5/2014 | Dzubay et al. |
| 2003/0118188 A1 | 6/2003 | Collier et al. |
| 2004/0230572 A1 | 11/2004 | Omoigui |
| 2006/0048059 A1 | 3/2006 | Etkin |
| 2006/0155653 A1 | 7/2006 | Persokrud et al. |
| 2006/0242238 A1 | 10/2006 | Issa |
| 2006/0248573 A1 | 11/2006 | Pannu et al. |
| 2007/0118525 A1 | 5/2007 | Svendsen |
| 2007/0157281 A1 | 7/2007 | Ellis et al. |
| 2008/0005348 A1 | 1/2008 | Kosiba et al. |
| 2008/0279419 A1 | 11/2008 | Kluesing et al. |
| 2008/0288499 A1 | 11/2008 | Choi et al. |
| 2009/0144392 A1 | 6/2009 | Wang et al. |
| 2009/0234815 A1 | 9/2009 | Boerries et al. |
| 2009/0249244 A1 | 10/2009 | Robinson et al. |
| 2009/0271247 A1 | 10/2009 | Karelin et al. |
| 2009/0292549 A1 | 11/2009 | Ma et al. |
| 2010/0036875 A1 | 2/2010 | Miezianko et al. |
| 2010/0153848 A1 | 6/2010 | Saha |
| 2010/0172551 A1 | 7/2010 | Gilley et al. |
| 2010/0180218 A1 | 7/2010 | Boston et al. |
| 2010/0191728 A1 | 7/2010 | Reilly et al. |
| 2011/0022529 A1 | 1/2011 | Barsoba et al. |
| 2011/0038512 A1 | 2/2011 | Petrou et al. |
| 2011/0087734 A1 | 4/2011 | Parsons et al. |
| 2011/0107369 A1 | 5/2011 | O'Brien et al. |
| 2011/0145275 A1 | 6/2011 | Stewart |
| 2011/0145719 A1 | 6/2011 | Chen et al. |
| 2011/0182482 A1 | 7/2011 | Winters et al. |
| 2011/0188742 A1 | 8/2011 | Yu et al. |
| 2011/0211736 A1 | 9/2011 | Krupka et al. |
| 2011/0211737 A1 | 9/2011 | Krupka et al. |
| 2012/0076367 A1 | 3/2012 | Tseng |
| 2012/0158753 A1 | 6/2012 | He et al. |
| 2012/0166533 A1 | 6/2012 | Rubinstein et al. |
| 2012/0250950 A1 | 10/2012 | Papakipos et al. |
| 2012/0250951 A1 | 10/2012 | Chen |
| 2012/0271790 A1 | 10/2012 | Lappas et al. |
| 2012/0310968 A1 | 12/2012 | Tseng |
| 2013/0117365 A1 | 5/2013 | Padmanabhan et al. |
| 2013/0275505 A1 | 10/2013 | Gauglitz et al. |
| 2014/0067702 A1 | 3/2014 | Rathod |
| 2014/0214843 A1 | 7/2014 | Arvig |
| 2014/0282013 A1 | 9/2014 | Amijee et al. |

OTHER PUBLICATIONS

Molly McHugh, Facebook Moments Is a Smarter Photo App—Much Smarter, Wired, Jun. 16, 2015, 9 pages.

Google Photos Explained: Should Everyone Switch to It?, guidingtech.com, Jan. 7, 2017, 9 pages.

Tim Moynihan, Google Photos Is Your New Essential Picture App, Wired, May 29, 2015, 10 pages.

Cisco Cheng, Intel Wireless Display (WiDi)/ The Hottest Sleeper Technology | News & Opinion , PCMag.com, Jan. 9, 2010, 2 pages.

IOS—Photos—Apple, Apple Inc., Jan. 7, 2017, 10 pages.

Elyse Betters, Miracast explained/ How is it different from Chromecast and AirPlay?, Dec. 30, 2015, 13 pages.

Kannon Yamada, Three Wireless Display Technologies That You Probably Own But Don't Use, MUO, Sep. 5, 2013, 11 pages.

Wireless Display Standards Explained/ AirPlay, Miracast, WiDi, Chromecast, and DLNA, howtogeek.com, Oct. 19, 2015, 5 pages.

David Carnoy, Apple AirPlay/ 10 things you need to know, CNET, Mar. 4, 2011, 16 pages.

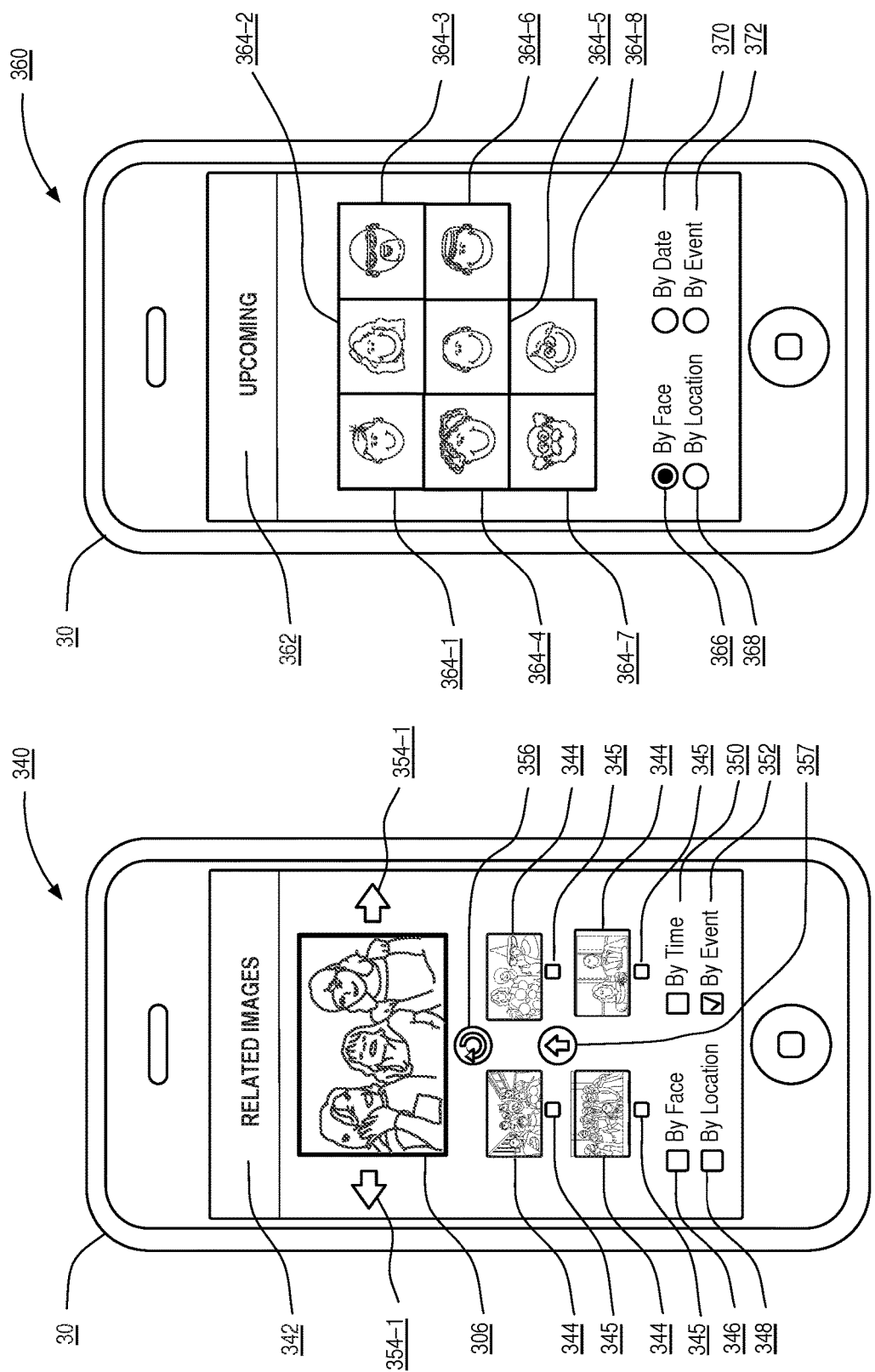

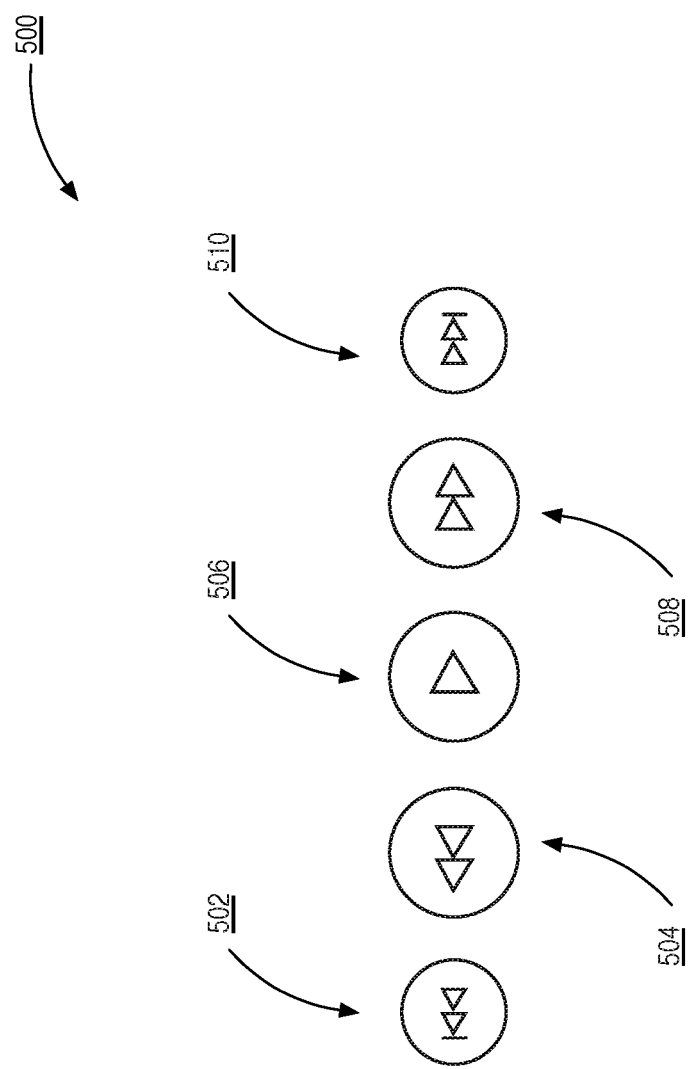

IMAGE SERVER DATABASE 1100

| ACCESS CODE 1110 | UNIQUE DEVICE IDENTIFIER 908 | SESSION IDENTIFIER 1114 | ENCRYPTED IMAGE 1116 | IMAGE SERVER SALT 1118 |
|---|---|---|---|---|
| 4291 | DISPLAY_DEVICE_IDENTIFIER_A | SESSION_IDENTIFIER_R | ENCRYPTED_IMAGE_1 | SALT_H |
| 4291 | DISPLAY_DEVICE_IDENTIFIER_A | SESSION_IDENTIFIER_R | ENCRYPTED_IMAGE_2 | SALT_H |
| 3532 | DISPLAY_DEVICE_IDENTIFIER_A | SESSION_IDENTIFIER_S | ENCRYPTED_IMAGE_3 | SALT_I |
| 3532 | DISPLAY_DEVICE_IDENTIFIER_A | SESSION_IDENTIFIER_S | ENCRYPTED_IMAGE_4 | SALT_I |
| 7494 | DISPLAY_DEVICE_IDENTIFIER_B | SESSION_IDENTIFIER_T | ENCRYPTED_IMAGE_5 | SALT_J |
| 7494 | DISPLAY_DEVICE_IDENTIFIER_B | SESSION_IDENTIFIER_T | ENCRYPTED_IMAGE_6 | SALT_J |
| 7494 | DISPLAY_DEVICE_IDENTIFIER_B | SESSION_IDENTIFIER_T | ENCRYPTED_IMAGE_7 | SALT_J |
| 7494 | DISPLAY_DEVICE_IDENTIFIER_B | SESSION_IDENTIFIER_T | ENCRYPTED_IMAGE_8 | SALT_J |
| 2977 | DISPLAY_DEVICE_IDENTIFIER_B | SESSION_IDENTIFIER_U | ENCRYPTED_IMAGE_9 | SALT_K |
| 2977 | DISPLAY_DEVICE_IDENTIFIER_B | SESSION_IDENTIFIER_U | ENCRYPTED_IMAGE_10 | SALT_K |
| 8789 | DISPLAY_DEVICE_IDENTIFIER_B | SESSION_IDENTIFIER_V | ENCRYPTED_IMAGE_11 | SALT_L |
| 8789 | DISPLAY_DEVICE_IDENTIFIER_B | SESSION_IDENTIFIER_V | ENCRYPTED_IMAGE_12 | SALT_L |
| 2724 | DISPLAY_DEVICE_IDENTIFIER_C | SESSION_IDENTIFIER_W | ENCRYPTED_IMAGE_13 | SALT_M |
| 2724 | DISPLAY_DEVICE_IDENTIFIER_C | SESSION_IDENTIFIER_W | ENCRYPTED_IMAGE_14 | SALT_M |
| 2724 | DISPLAY_DEVICE_IDENTIFIER_C | SESSION_IDENTIFIER_W | ENCRYPTED_IMAGE_15 | SALT_M |
| 1634 | DISPLAY_DEVICE_IDENTIFIER_D | SESSION_IDENTIFIER_X | ENCRYPTED_IMAGE_16 | SALT_N |
| 1634 | DISPLAY_DEVICE_IDENTIFIER_D | SESSION_IDENTIFIER_X | ENCRYPTED_IMAGE_17 | SALT_N |
| 1634 | DISPLAY_DEVICE_IDENTIFIER_D | SESSION_IDENTIFIER_X | ENCRYPTED_IMAGE_18 | SALT_N |
| 1634 | DISPLAY_DEVICE_IDENTIFIER_D | SESSION_IDENTIFIER_X | ENCRYPTED_IMAGE_19 | SALT_N |
| 6500 | DISPLAY_DEVICE_IDENTIFIER_E | SESSION_IDENTIFIER_Y | ENCRYPTED_IMAGE_20 | SALT_O |
| 6500 | DISPLAY_DEVICE_IDENTIFIER_E | SESSION_IDENTIFIER_Y | ENCRYPTED_IMAGE_21 | SALT_O |
| 6182 | DISPLAY_DEVICE_IDENTIFIER_E | SESSION_IDENTIFIER_Z | ENCRYPTED_IMAGE_22 | SALT_P |
| 6182 | DISPLAY_DEVICE_IDENTIFIER_E | SESSION_IDENTIFIER_Z | ENCRYPTED_IMAGE_5 | SALT_P |
| 6182 | DISPLAY_DEVICE_IDENTIFIER_E | SESSION_IDENTIFIER_Z | ENCRYPTED_IMAGE_6 | SALT_P |
| 6182 | DISPLAY_DEVICE_IDENTIFIER_E | SESSION_IDENTIFIER_Z | ENCRYPTED_IMAGE_7 | SALT_P |
| 6182 | DISPLAY_DEVICE_IDENTIFIER_E | SESSION_IDENTIFIER_Z | ENCRYPTED_IMAGE_23 | SALT_P |
| 6182 | DISPLAY_DEVICE_IDENTIFIER_E | SESSION_IDENTIFIER_Z | ENCRYPTED_IMAGE_24 | SALT_P |
| 6182 | DISPLAY_DEVICE_IDENTIFIER_E | SESSION_IDENTIFIER_Z | ENCRYPTED_IMAGE_25 | SALT_P |
| 6182 | DISPLAY_DEVICE_IDENTIFIER_E | SESSION_IDENTIFIER_Z | ENCRYPTED_IMAGE_26 | SALT_P |

FIG. 11A

COMPUTING DEVICE DATABASE 1120

| COMPUTING DEVICE 1 DATABASE 1140 | |
|---|---|
| SESSION IDENTIFIER 1114 | STORAGE KEY 910 |
| SESSION_IDENTIFIER_R | STORAGE_KEY_1 |
| SESSION_IDENTIFIER_U | STORAGE_KEY_2 |

| COMPUTING DEVICE 2 DATABASE 1142 | |
|---|---|
| SESSION IDENTIFIER 1114 | STORAGE KEY 910 |
| SESSION_IDENTIFIER_T | STORAGE_KEY_2 |
| SESSION_IDENTIFIER_V | STORAGE_KEY_2 |
| SESSION_IDENTIFIER_Z | STORAGE_KEY_5 |

| COMPUTING DEVICE 3 DATABASE 1144 | |
|---|---|
| SESSION IDENTIFIER 1114 | STORAGE KEY 910 |
| SESSION_IDENTIFIER_S | STORAGE_KEY_1 |
| SESSION_IDENTIFIER_W | STORAGE_KEY_3 |
| SESSION_IDENTIFIER_X | STORAGE_KEY_4 |

FIG 11B

DISPLAY DEVICE DATABASE 1130

DISPLAY DEVICE A DATABASE 1150

| UNIQUE DEVICE IDENTIFIER 908 | DISPLAY_DEVICE_IDENTIFIER_A |
|---|---|
| STORAGE KEY 910 | STORAGE_KEY_1 |

| SESSION_IDENTIFIER 1114 |
|---|
| SESSION_IDENTIFIER_R |
| SESSION_IDENTIFIER_S |

DISPLAY DEVICE B DATABASE 1152

| UNIQUE DEVICE IDENTIFIER 908 | DISPLAY_DEVICE_IDENTIFIER_B |
|---|---|
| STORAGE KEY 910 | STORAGE_KEY_2 |

| SESSION IDENTIFIER 1114 |
|---|
| SESSION_IDENTIFIER_T |
| SESSION_IDENTIFIER_U |
| SESSION_IDENTIFIER_V |

DISPLAY DEVICE A DATABASE 1154

| UNIQUE DEVICE IDENTIFIER 908 | DISPLAY_DEVICE_IDENTIFIER_C |
|---|---|
| STORAGE KEY 910 | STORAGE_KEY_3 |

| SESSION IDENTIFIER 1114 |
|---|
| SESSION_IDENTIFIER_W |

DISPLAY DEVICE A DATABASE 1156

| UNIQUE DEVICE IDENTIFIER 908 | DISPLAY_DEVICE_IDENTIFIER_D |
|---|---|
| STORAGE KEY 910 | STORAGE_KEY_4 |

| SESSION IDENTIFIER 1114 |
|---|
| SESSION_IDENTIFIER_X |

DISPLAY DEVICE A DATABASE 1158

| UNIQUE DEVICE IDENTIFIER 908 | DISPLAY_DEVICE_IDENTIFIER_E |
|---|---|
| STORAGE KEY 910 | STORAGE_KEY_5 |

| SESSION IDENTIFIER 1114 |
|---|
| SESSION_IDENTIFIER_Y |
| SESSION_IDENTIFIER_Z |

FIG 11C

SYSTEM AND DEVICE FOR INTERACTING WITH A REMOTE PRESENTATION

RELATED APPLICATIONS

This application claims priority from U.S. patent application Ser. No. 15/186,743, entitled "SYSTEM AND DEVICE FOR INTERACTING WITH A REMOTE PRESENTATION", which was filed on Jun. 20, 2016 and U.S. Provisional Application Ser. No. 62/182,461 which was filed on Jun. 20, 2015. All are commonly owned and are all incorporated herein by reference in their entirety.

TECHNICAL AREA

The present disclosure relates to sharing images over a network. Images obtained from a second device are presented at a first device, and shared with a plurality of third devices. The third devices are able to obtain and store images from the first device, modify the contents of a presentation, and control the rendering of the presentation.

BACKGROUND

Every day millions of digital images are captured with smart phones and the like. Opportunities exist for sharing these images electronically using photosharing services and social networks. However, these methods typically require creating accounts at the various services, uploading the images to be shared, inviting friends to view the images, and setting privacy options to make sure the images are shared with only those desired. What is needed is a solution that removes these barriers, and provides for a more frictionless ad-hoc sharing. The proposed system allows for instantaneous sharing without the need to set up accounts beforehand, uploading only the images that are requested for sharing, and does not require invitations or privacy settings.

SUMMARY

With the proliferation of high resolution networked display devices, such as a high definition smart TV, it has become possible to obtain and display images from a remote network source. Some smart TVs come with a built-in capability to receive and display images from a network source. Smart TVs also run 3rd party software applications, and are able to download these applications to provide to aforementioned capability. These 3rd party applications are typically provided by companies in the photo sharing business that wish to enable users of their systems to conveniently access photographs from their accounts on smart TV's and other similar network connected devices.

The growing installed base of smart TV, over-the-top (OTT) devices, and the like, provides an opportunity to share the displayed images that is not currently being exploited to full effect. When a user is displaying images on the smart TV, in many cases other users viewing the images may want to gain access to the images, and copy some or all of the images. What is needed is a way to provide access to these users with a minimum number of steps.

In some embodiments of the present disclosure, a user with LAN access is enabled to discover and join an image presentation. The user is then able to access all images from the image presentation, and perform certain operations on the images. One of the available operations is to save one or more of the images from the image presentation. The device may save the images to its own memory, or instruct them to be saved to another device. The other device may be on the same local area network or over a wide area network such as the Internet.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a first device comprising: a communications interface operable to: couple the first device to a second device and a third device over a local area network; and couple the first device and a fourth device over a wide area network; and a processor and a memory associated with the communications interface and operable to: store, at the fourth device, a plurality of presentations; publish, on the local area network, availability information, the availability information enabling access to information identifying the plurality of presentations; based on a command received from the second device, initiate rendering from the fourth device of a designated presentation of the plurality of presentations; receive, from the third device, a request to control the rendering of the designated presentation; and effect, at the third device, based on permission received from the second device, rendering control of the designated presentation. Other embodiments of this aspect include corresponding computer systems, apparatus, and computer programs recorded on one or more computer storage devices, each configured to perform the actions of the methods.

Implementations may include one or more of the following features. The first device wherein operations are performed without requiring reception of account credentials from the second device or third device for the first device or fourth device. The first device wherein the first device is a display device selected from the group consisting of a television, set-top-box, over-the-top device, game console, and personal computer, and the second device and the third device are computing devices selected from the group consisting of a mobile phone, personal computer, and tablet computer. The first device wherein the designated presentation is comprised of: an ordered list of one or more media item identifiers, a presentation name, a presentation cover, a presentation identifier, and a presentation current position. The first device wherein the media item identifiers are one or more of: image identifiers, video identifiers, and audio identifiers. The first device wherein to store the designated presentation to the fourth device the processor and the memory are further operable to: request, from the second device, media items identified by the designated presentation; receive, from the second device, the media items; and send, to the fourth device, the media items. The first device wherein to store the designated presentation to the fourth device the processor and the memory are further operable to: determine a unique device identifier; and send, to the fourth device with the designated presentation, the unique device identifier. The first device wherein the processor and the memory are further operable to: send, to the fourth device, the unique device identifier; and receive, from the fourth device, based on the unique device identifier, a listing of all presentations stored at the fourth device and linked to the unique device identifier. The first device wherein to store the designated presentation to the fourth device the processor and the memory are further operable to: determine a storage key; encrypt, using the storage key and, prior to sending to the fourth device, the designated presentation to produce an encrypted presentation; and send, to the fourth device, without sending the storage key, the encrypted presentation. The first device wherein the processor and the memory are further operable to: receive from the fourth device, the encrypted presentation; and decrypt, using the storage key, the encrypted presentation. The first device wherein the processor and the memory are further operable to: receive, from the fourth device, an identifier assigned by the fourth device to the designated presentation; and send, to the fourth device, the identifier assigned by the fourth device to the designated presentation. The first device wherein the processor and the memory are further operable to: receive the designated presentation from the first device comprises: receive a presentation list comprising a plurality of media item identifiers; and receive a plurality of media items identified by the plurality of media item identifiers. The first device wherein the processor and the memory are further operable to: determine that a sharing session has started; assign a session identifier to the sharing session; link, using linking information, one or more presentations of the plurality of presentations viewed during the sharing session to the session identifier; and send the session identifier and the linking information to the fourth device. The first device wherein to determine that the sharing session has started, the processor and the memory are further operable to: determine an access code; present on a display coupled to the first device, the access code; and receive from the third device, the access code. The first device wherein the processor and the memory are further operable to: send the session identifier to the fourth device; and receive from the fourth device, in response to sending the session identifier, information identifying the plurality of presentations viewed during the sharing session. The first device wherein the processor and the memory are further operable to: send, to the third device, a storage key. The first device wherein the information identifying the plurality of presentations is one or more of alphanumeric names and cover information. The first device wherein to initiate rendering of the designated presentation the processor and the memory are further operable to: receive, from the third device, a second command modifying rendering; apply the second command; and effect, at the second device, presentation of the designated presentation. The first device wherein to publish availability information the processor and the memory are further operable to: receive, from the third device, a second request for the designated presentation; and send, to the third device, one or more media item identifiers identifying a corresponding one or more media items. The first device wherein the processor and the memory are further operable to: receive, from the third device, a third request for one or more media items corresponding to the one or more media item identifiers; and send, to the third device, the one or more media items. The first device wherein the processor and the memory are further operable to: receive, from the third device, a third request for at least a portion of a designated media item identified by the one or more media item identifiers; receive, from the second device, the portion of the designated media item; store, at the first device, the portion of the designated media item at the first device; and sending, to the third device, the portion of the designated media item. The first device wherein the processor and the memory are further operable to: receive, from the third device, a second request to delete a designated media item from the designated presentation. The first device wherein the processor and the memory are further operable to: receive, from the third device, a second request to reorder media items in the designated presentation. The first device wherein the processor and the memory are further operable to: receive, from the third device, a second request to modify the designated presentation; modify the designated presentation to produce a modified presentation; and store the modified presentation. The first device wherein the processor and the memory are further operable to: receive, from the third device, a second request to add a media item to the designated presentation to produce a modified presentation. The first device wherein to publish availability information the processor and the memory are further operable to: store the modified presentation at the first device. The first device wherein to store the modified presentation the processor and the memory are further operable to: store the modified presentation at the fourth device. The first device wherein to initiate rendering of the designated presentation the processor and the memory are further operable to: present in a first area of a display coupled to the first device a current media item; and present in a second area of the display, one or more related media items, wherein the related media items are not included in the designated presentation. The first device of claim 28 wherein the processor and the memory are further operable to: receive the one or more related media items from one or more of the second device and the third device. The first device wherein the one or more related media items are one or more related images, and the one or more related images are related based on one or more factors chosen from a group consisting of: a subject face, an event, a geographical location, a time of capture, a location of capture, a person having captured a currently displayed image, and a device providing a currently displayed image. The first device wherein the processor and the memory are further operable to: receive account credentials for a fifth device; and effect transfer of one or more media items to the fifth device, wherein the fifth device is one of a photosharing site and a social networking site.

One general aspect includes a method of operating a first device comprising: receiving, at the first device, a plurality of presentations, the first device coupled to a second device and a third device over a local area network, and a fourth device over a wide area network; store, at the fourth device, the plurality of presentations; publish, on the local area network, availability information, the availability information enabling access to information identifying the plurality of presentations; based on a command received from the second device, initiate rendering from the fourth device of a designated presentation of the plurality of presentations; receive, from the third device, a request to control the rendering of the designated presentation; and effect, at the third device, based on permission received from the second device, rendering control of the designated presentation.

One general aspect includes a non-transitory computer readable medium storing program codes operable to instruct a processor in a first device to: receive, at the first device, a plurality of presentations, the first device coupled to a second device and a third device over a local area network, and a fourth device over a wide area network; store, at the fourth device, the plurality of presentations; publish, on the local area network, availability information, the availability information enabling access to information identifying the plurality of presentations; based on a command received from the second device, initiate rendering from the fourth device of a designated presentation of the plurality of presentations; receive, from the third device, a request to control the rendering of the designated presentation; and effect, at the third device, based on permission received from the second device, rendering control of the designated presentation.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 3C illustrates an exemplary user interface of a computing device for displaying other accessible media items that are related to the current media being displayed at a display device;

FIG. 3D illustrates an exemplary user interface of a computing device for displaying information regarding upcoming items in a presentation being displayed at a display device;

FIG. 5 illustrates an exemplary portion of the user interface of FIGS. 3A and 3B for controlling the rendering of the remote presentation;

FIG. 11A is an exemplary database on the image server device according to one exemplary embodiment of the present disclosure;

FIG. 11B is an exemplary database on the plurality of computing devices according to one exemplary embodiment of the present disclosure;

FIG. 11C is an exemplary database on the plurality of display devices according to one exemplary embodiment of the present disclosure;

DETAILED DESCRIPTION

Figure 1A:
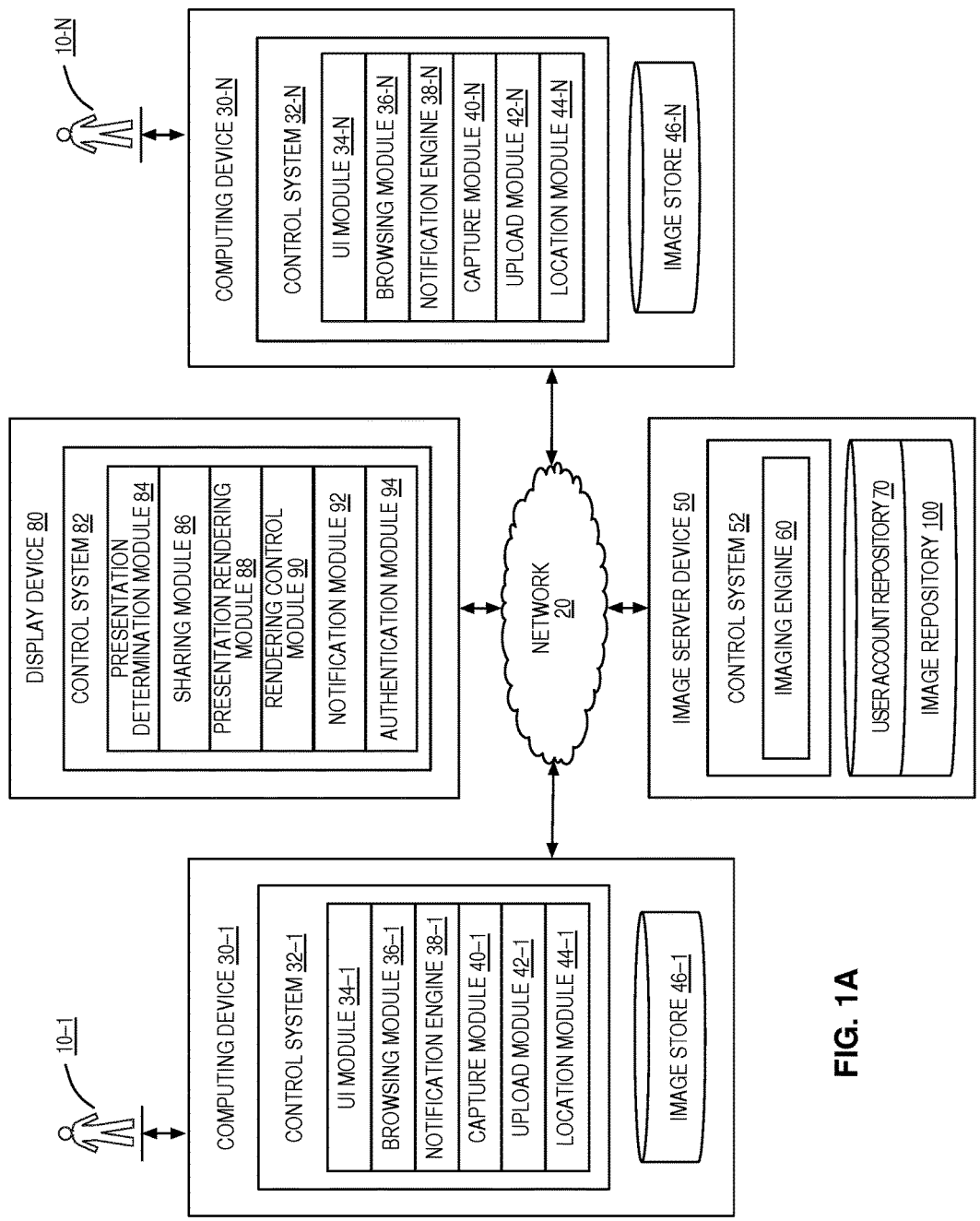
FIG. 1A illustrates an exemplary system for interacting with a remote presentation.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, flash memory, solid state memory, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Recitation of ranges of values herein are merely intended to serve as a shorthand method of referring individually to each separate value falling within the range, unless otherwise indicated herein, and each separate value is incorporated into the specification as if it were individually recited herein. Therefore, any given numerical range shall include whole and fractions of numbers within the range. For example, the range "1 to 10" shall be interpreted to specifically include whole numbers between 1 and 10 (e.g., 1, 2, 3, . . . 9) and non-whole numbers (e.g., 1.1, 1.2, . . . 1.9).

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Where a process is described in an embodiment the process may operate without any user intervention.

As referred to herein, the term "computing device" should be broadly construed. It can include any type of mobile device, for example, a smart phone, a cell phone, a pager, a personal digital assistant (PDA, e.g., with GPRS NIC), a mobile computer with a cellular radio, or the like. A typical mobile device is a wireless data access-enabled device (e.g., an iPHONE® smart phone, a BLACKBERRY® smart phone, a NEXUS ONE™ smart phone, an PAD™ device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device 30.

Operating environments in which embodiments of the present disclosure may be implemented are also well-known. In a representative embodiment, a computing device 30 (shown in FIG. 1 for example), such as a mobile device, is connectable to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or a 4G-compliant device) that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store. The presently disclosed subject matter is now described in more detail.

For example, FIG. 1 illustrates a block diagram of an exemplary system for interacting with a remote presentation according to embodiments of the present disclosure. Referring to FIG. 1, the system includes a computing device 30.

The computing device 30 may be any type of computing device 30 capable of receiving communications from another device. The computing device 30 comprises a number of functional components. This representation of the computing device 30 is meant to be for convenience of illustration and description, and it should not be taken to limit the scope of the present disclosure as one or more functions may be combined. Typically, these components are implemented in software (as a set of process-executable computer instructions, associated data structures and the like). One or more of the functions may be combined or otherwise implemented in any suitable manner (e.g., in hardware, in firmware, in combined hardware and software, or the like). Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions. The computing device 30 may include a graphics-rendering engine for displaying information and images to the user 10 in the usual manner. In one embodiment of the present disclosure, the graphics-rendering engine may be used to display the exemplary user interface illustrated in FIGS. 2A, 2B, 3A-3D, and 6A-6D. The computing device 30 is Internet-accessible and can interact with the image server device 50 and display device 80, by use of any suitable Internet protocols such as HTTP, HTTPS, FTP, and the like.

A computing device 30 may be, for example, a personal computer, tablet computer, smart phone, set top box, game console, or any device configured with computing hardware, software, and/or firmware configured to implement the functions of the computing device 30 in accordance with embodiments of the present disclosure. A computing device, such as computing device 30, may include a control system (e.g., control systems 32), which is configured to communicate with and to interact with the display device 80, other computing devices 30, and the image server device 50. The UI module 34 may provide notifications to the user 10 of the computing device 30. The UI module inter alia operates to display the user interface elements such as those described in FIGS. 2A, 2B, 3A-3D, and 6A-6D. The UI module may include, but is not limited to, a display, a speaker, one or more buttons, and/or the like. The notification engine 38 may operate to receive notifications at the computing device 30. In embodiments of the present disclosure, a browsing module, such as browsing module 36, is a web browser capable of communicating with the display device 80 using HTTP protocols and rendering HTML at the corresponding computing device 30. In some instances, the web browser is a separate standalone web browser. In other instances, the browser functionality is incorporated into another software module for enhancing integration and usability. A capture module, such as capture modules 40, may operate to manage the capture of images by an image capture module of the computing device 30, and the subsequent storing of the images in an image store (e.g., image store 46) and/or the image repository 100. Transmission of the images from a computing device 30 to the image server device 50 may be implemented by an upload module, such as upload module 42. A location module, such as location modules 44, may operate to determine geographical coordinates of a location at which one or more images were captured by the capture module 40 for the purpose of storing or otherwise associating the capture location with the image(s). The location module may determine the location based on technologies including GPS (satellite assisted), A-GPS (tower assisted), IP Address Translation, and or WIFI triangulation services (such as Skyhook for example).

Note that some computing devices 30 may not include all modules described herein. For example, some devices may not include an image capture module.

The system further comprises a display device 80. The display device may be one of a television, smart TV, set-top-box, over-the top device, game console, av receiver, personal computer, and the like. As used herein, an OTT device is a device that allows for the delivery of audio, video, and other media over the Internet without the involvement of a multiple-system operator in the control or distribution of the content. Examples of OTT devices include the AppleTV, Roku, Amazon Fire, Google Chromecast, and the like. The display device 80 may be comprised of a control system 82, presentation determination module 84, sharing module 86, presentation rendering module 88, rendering control module 90, notification module 92, and authentication module 94. The presentation determination module 84 may operate to create the presentation 160 or to receive the presentation 160 depending on the mode of operation. In one aspect, the presentation 160 is created at the display device 80 based on inputs received at the display device 80. In another aspect, the presentation 160 is received from a control device on the same local area network as the display device 80. The sharing module 86 operates to publish the availability of the presentation 160 being shown at the display device 80 to other computing devices 30 on the local area network that may wish to participate in the presentation 160 rendering. The availability information may be advertised on the network using technologies such as zeroconf, Bonjour, UPnP, Simple Service Discovery Protocol (SSDP), and the like. Participation may include viewing the presentation 160 of their computing device 30, interacting with the presentation 160 on their computing device 30, receiving ancillary information about the contents of the presentation 160 as it is playing, and the like. The presentation rendering module 88 operates to present the contents of the presentation 160 on the display of the display device 80. The rendering control module 90 operates to process inputs and/or commands directed to the rendering state of the presentation 160, and to change the state of the presentation 160 rendering according to those inputs and/or commands. The inputs may be received at the display device 80, through a TV remote control for example, or from a computing device 30 over the LAN. The notification module 92 operates to send and receive notifications. Received notifications may be presented at the display device 80 and/or forwarded to other connected computing devices 30. The notification module 92 may also send notifications based on events originating at the display device 80. The authentication module 94 operates to validate the identity of computing devices 30 attempting to participate in the presentation 160 rendering. In some embodiments, no validation is required (other than a presence on the LAN). This does not mean that a computing device 30 will not have to take steps to gain access to the local area network, but no additional user supplied passwords and/or credentials to access the presentation 160 are required. In other embodiments, an access code 1110 is displayed at the display device 80, and the user 10 of a computing device 30 must correctly enter the access code 1110 at the computing device 30 to gain access to the presentation 160. In some embodiments, this access code 1110 changes for each new user 10. In other embodiments, the computing device 30 creating the presentation 160 provides the access code 1110 that must be entered by other computing devices 30 wishing to participate in the presentation 160 rendering. This access code 1110 may be displayed at the display device 80, or communicated through other means. In some embodiments, the computing device 30 is able to provide a presentation 160 to the display device 80 without interacting with the display device 80 other than through the network 20 using the computing device 30.

The system further comprises an image server device 50. The image server is comprised of a control system 52, imaging engine 60, user account repository 70, and image repository 100. The image server device 50 may provide images for a presentation 160, or may receive images that a computing device 30 participating in a presentation 160 rendering wishes to save for later access. The imaging engine 60 provides image processing related functions such as providing a stored image in different formats and resolutions, and/or dynamically transcoding formats in real-time upon request. The user account repository 70 stores information regarding the various users of the image server device 50, and the images they have stored in the image repository 100. In some embodiments the media items 178 may be video items in addition to or instead of image items. In some embodiments, the presentation 160 may be comprised of a mixture of data types including still images, videos, and the like.

Figure 1B:
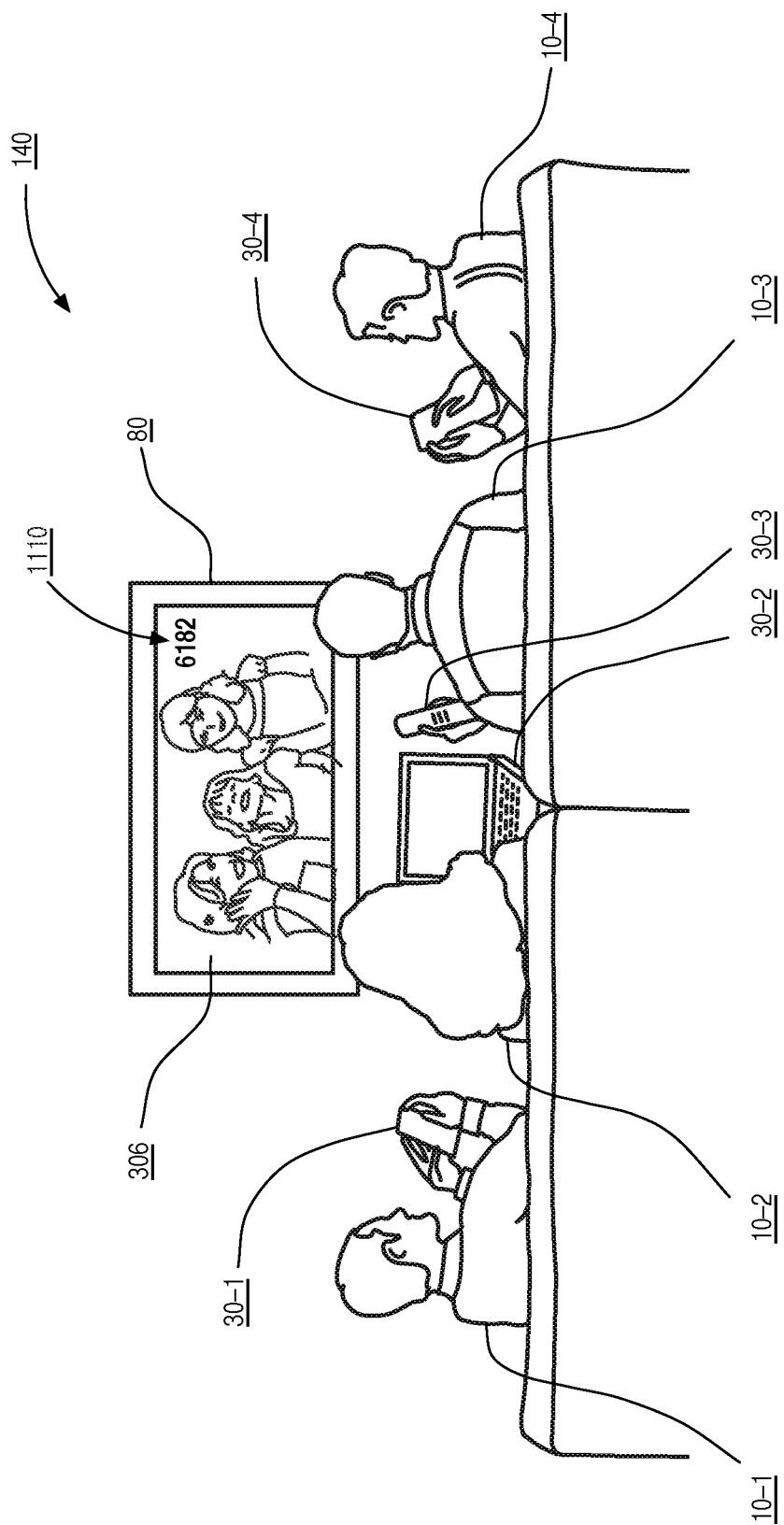
FIG. 1B illustrates an exemplary environment for interacting with a remote presentation.

Referring now to FIG. 1B, an illustration of an exemplary environment 140 is provided. In this example, we have four computing devices 30-1 through 30-4, corresponding to four viewing users 10-1 through 10-4. The four users 10 are all sitting on a couch in front of a display device 80 showing a current image 306. In this example, the display device 80 is a network enabled TV (SmartTV). The presentation 160 may have been determined at the display device 80, as is described in more detail in FIG. 7. In another mode of operation, as shown in FIG. 8, the presentation 160 may have been determined at a computing device 30 and provided to the display device 80. Each of the users 10 is enabled to interact with the presentation 160 rendering at the display device 80 as illustrated through the exemplary UI described in FIGS. 3A, 3B, 3C, and 3D.

In some instances, a user will gain access to the local area network simply through plugging in via an Ethernet cable. As such, no network credentials are required.

As described above and throughout the present disclosure, the sharing of images and other media types, is enabled wherein the participating users 10 need not supply account user id and password) information for a photosharing site, social network, or the like prior to the sharing of images. As will be described in the present disclosure, in some embodiments, participating users may be enabled to associate images viewed in a presentation with an external account, such as a photosharing site, social network, or the like, after the sharing session has ended. This association may be made before or after the sharing of images takes place, but is not a pre-requisite to sharing.

The present disclosure uses exemplary figures and nomenclature that describe the sharing of images in particular. As described herein, the present disclosure is not limited to the sharing of images. The present disclosure contemplates the sharing of other data types such as video and audio in particular.

As used herein, follower devices, or "followers", refers to computing devices 30 that are being operated by users 10 other than the presentation creator or presentation designator a user selecting an existing presentation to render). As noted elsewhere in the disclosure, a following device may become a controlling device through a request handshake. If the request handshake is completed, and permission by the current controlling device is granted, then the current controlling device is pushed onto a "stack" and that device becomes a following device until permission is returned by the now controlling device. As part of granting permission, the granting device may specify if the requesting device may pass permission to another following device, or whether control can only be returned to the granting device.

Figure 1C:
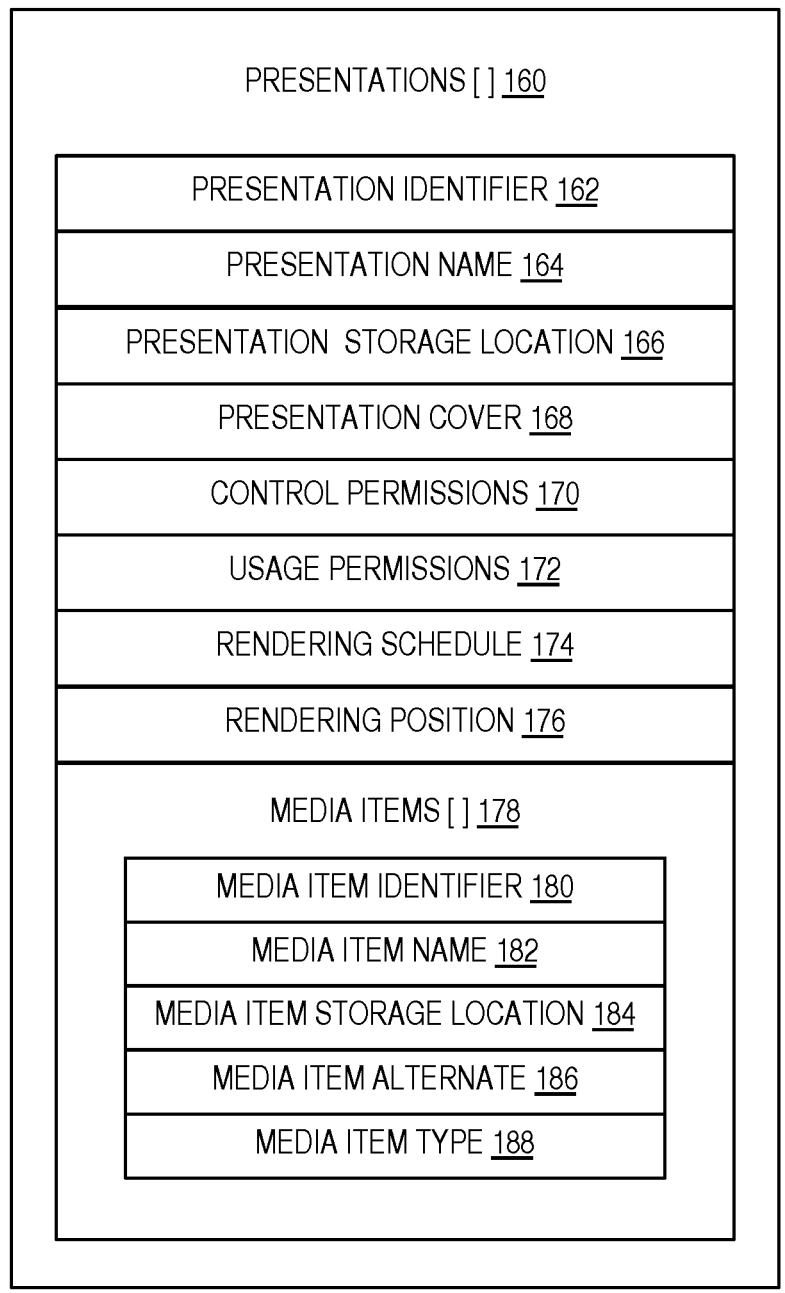
FIG. 1C illustrates an exemplary structure for information defining a presentation.

Referring now to FIG. 1C, each of one or more presentations 160 are comprised of a presentation identifier 162, a presentation name 164, a presentation storage location 166, a presentation cover 168, control permission 170, usage permissions 172, rendering schedule 174, rendering position 176, and one or more media items 178. Each of the one or more media items 178 is comprised of a media item identifier 180, media item name 182, media item storage location 184, media item alternate 186, and media item type 188.

The presentation identifier 162 identifies the location of the presentation 160. In some embodiments, the presentation identifier may be a URL. The presentation name 164 stores an alpha numeric name of the presentation 160 suitable for display. The presentation storage location 166 indicates the storage location of the presentation 160. The presentation storage location 166 may be the image store 46, the image repository 100, some other accessible location, or any combination thereof. The presentation cover 168 is a graphical element that may be displayed to represent the presentation 160. In the case of a presentation 160 comprised of images, the presentation cover 168 may be a representative image from the presentation 160. In the case of a presentation 160 comprised of multiple videos, the presentation cover 168 may be representative still image frame from one of the videos. The control permissions 170 are set by a device in response to inputs received from a user and provide information indicating how the users of the presentation 160 may control the rendering of the presentation at the display device 80. The usage permissions 172 are preferences set by the device in response to inputs received from a user that indicate if the users of the presentation 160 may reuse the various media items 178. The rendering schedule 174 comprises information indicating when media item 178 each will be presented. The rendering position 176 comprises information indicating the current media item being displayed at the display device 80. In the case of a video media item 178, the rendering position 176 may be indicted as a time.

The media item identifier 180 identifies the location of the media item 178. In some embodiments, the media item identifier 180 may be a URL. The media item name 182 stores an alpha numeric name of the media item 178 suitable for display. The media item storage location 184 indicates the storage location of the media item 178. The media item storage location 184 may be the image store 46, the image repository 100, some other accessible location, or any combination thereof. The media item alternate 186 indicates an alternative version of the media item 178. For example, in the case of an image media item 178, the media item alternate 186 may be a lower resolution thumbnail image. In the case of a video presentation 160, the media item alternate

186 may be a lower resolution version of the video. The media item type 188 indicates the type of the media item 178. The type may be an image, video, or the like.

Figure 2B:
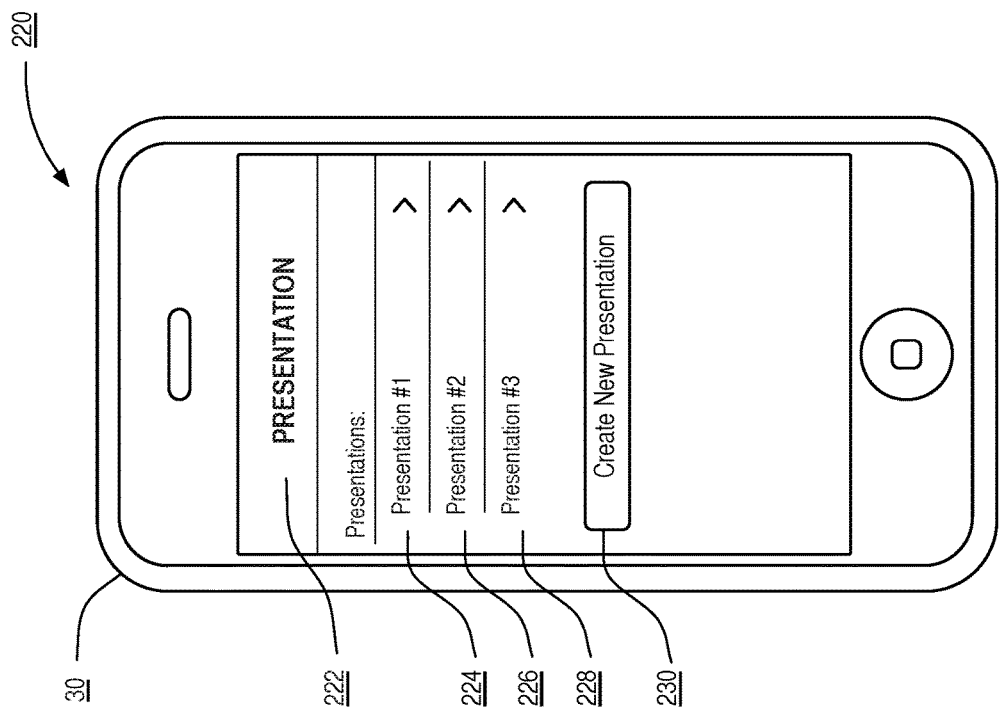
FIG. 2B illustrates an exemplary user interface of a computing device for selecting or creating a presentation.
Figure 2A:
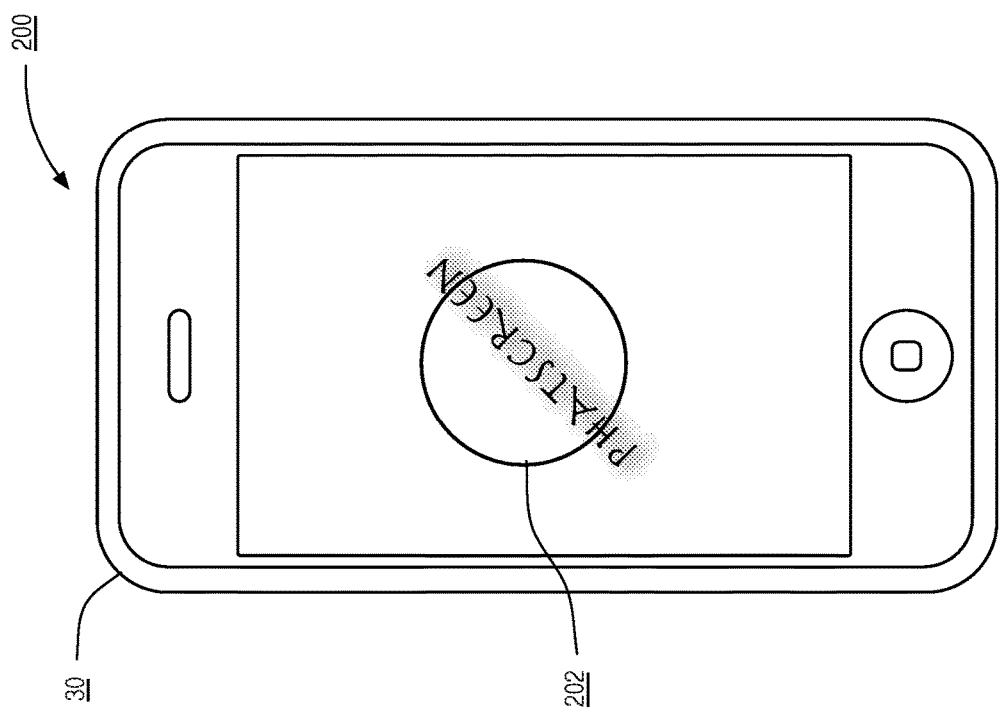
FIG. 2A illustrates an exemplary user interface of a computing device for displaying a splash screen.

FIG. 2A illustrates an exemplary user interface 200 of a computing device 30 for displaying a splash screen 202.

FIG. 2B illustrates an exemplary user interface 220 of a computing device 30 for designating the media items 178 comprising a presentation 160. The user interface includes a title 222. Presentations 160 that are in-progress are shown in items 224, 226, and 228 respectively. As used herein, in-progress presentation 160 refers to a presentation 160 that is currently playing, and has not reached its end. A presentation 160 rendering that is paused midstream, is therefore still an in-progress presentation. If the user 10 does not wish to join an in-progress presentation, the user 10 may access a different presentation 160, or create 230 a new presentation 160.

Figure 3B:
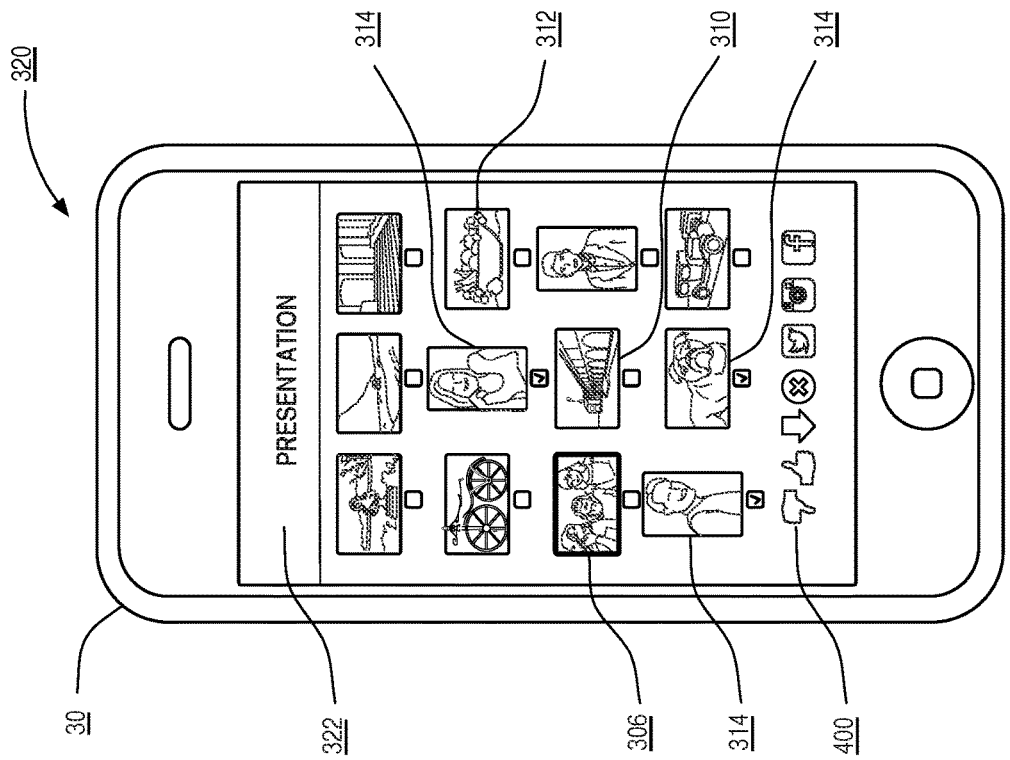
FIG. 3B illustrates an exemplary user interface of a computing device for designating actions to be performed on media items.
Figure 3A:
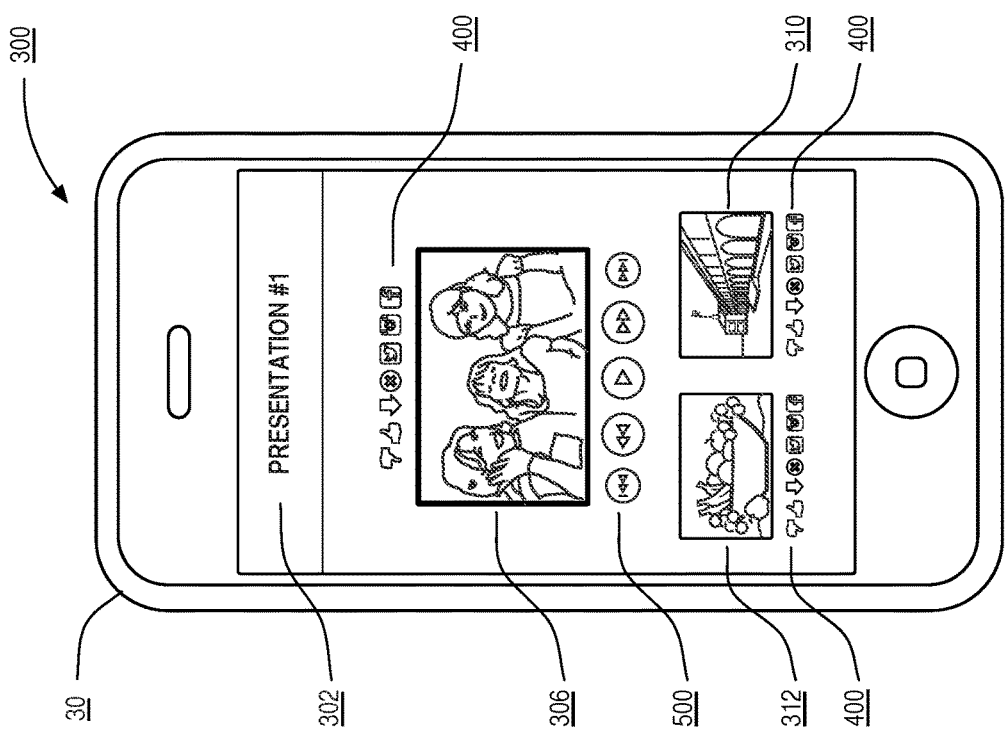
FIG. 3A illustrates an exemplary user interface of a computing device for displaying and interacting with the remote presentation.

FIG. 3A illustrates an exemplary user interface 300 of a computing device for displaying and interacting with the remote presentation. The current image 306 is being presented. Posting controls 400 for interacting with the media item 178 are shown above the current item. The item previously presented 312 is shown below the current item. The next media item 310 to be shown is displayed to the right and below the current media item 178.

FIG. 3B illustrates an exemplary user interface 320 of a computing device for displaying and interacting with the remote presentation. In some embodiments, all media items 178 in the sequence of media items to be displayed are shown. If the media items to be shown exceed one page, then the media items 178 are displayed over multiple pages. The current media item 306, the previous media item 312, and the next media item 310 are shown among the other media items 178. The posting controls 400 are shown below all displayed media items 178. In FIG. 3B, the posting controls 400 are invoked by first selecting the media items 178 to be operated on, then invoking the desired posting control 400. In this example, three media items 314 are marked for operation.

FIG. 3C illustrates an exemplary user interface 340 of a computing device for displaying other accessible media items that are related to the current media being displayed at the display device. In some embodiments, images 344 will reside in the image store 46 at the computing device 30, and the user 10 will be enabled to contribute 357 one or more related images 344 to the presentation 160 at the display device 80. The images to contribute may be designated in response to user input via the checkbox controls 345. The related images 344 may be chosen based one or more factors such as subject faces 346, location 348, time 350, event 352, keyword, etc. The related images 344 may be chosen based on the current image, a user designated image, all images, or upcoming images. A "following" user 10 may use the navigation controls 354 to move through the sequence of images synchronously with the user controlling rendering, or asynchronously in a different order and/or rendering speed. The "following" user 10 may select the resync button 356 at any time to return to the image currently being shown at the display device 80.

Referring now to FIG. 3D, in another aspect of the present disclosure, the computing device 30 displays an exemplary interface 360 information or metadata on images that are scheduled for future presentation at the display device 80. This metadata may include for example, information identifying subjects appearing in the upcoming images 366, capture location for upcoming images 368, capture date 370, event 372, image contributor, keyword, and the like. In some embodiments, the information identifying subjects appearing in the upcoming images comprises visual representations of the subjects. In the example of FIG. 3D, the user 10 has provided input indicating that the faces contained in upcoming images 364 should be shown. In some embodiments, the visual representations of the subjects comprise images of the faces of the subjects.

Figure 4:
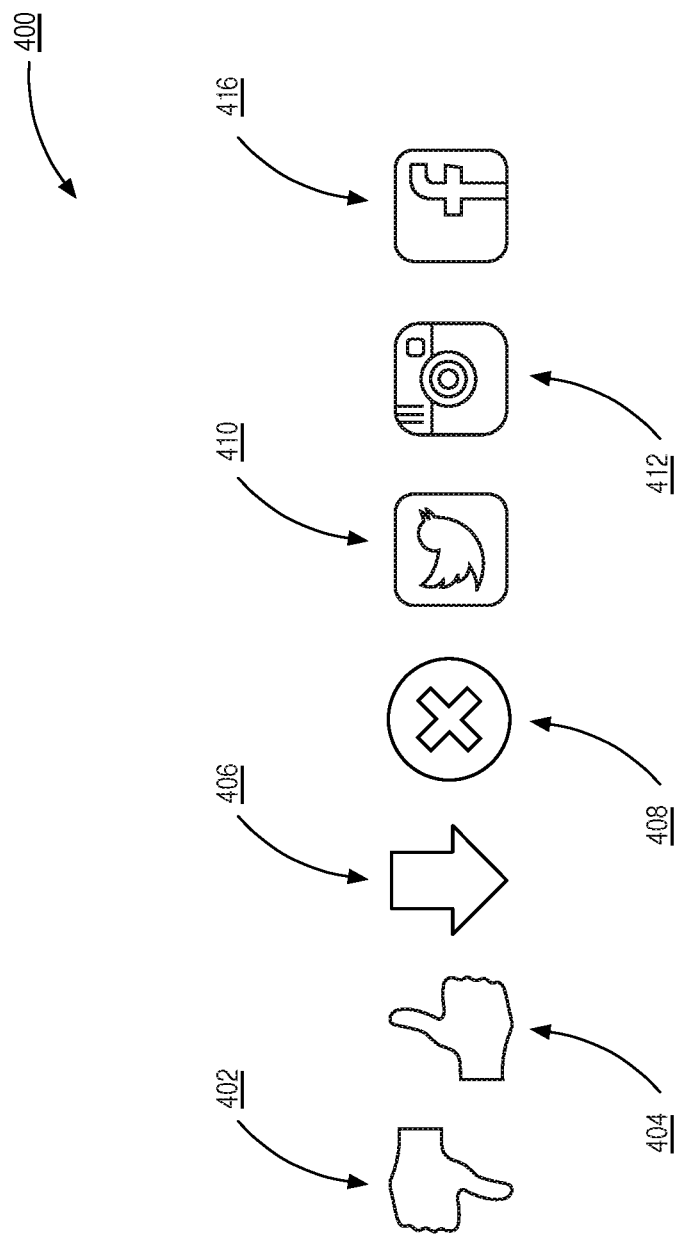
FIG. 4 illustrates an exemplary portion of the user interface of FIGS. 3A and 3B for interacting with selected images.

FIG. 4 illustrates an aspect 400 of the user interface of FIGS. 3A and 3B for interacting with the media items 178. The "thumbs-up" control 404 is invoked by the user 10 to indicate that the media item 178 is favored. The "thumbs-down" control 402 is invoked by the user 10 to indicate that the media item 178 is not favored. The download control 406 is operable to receive input marking the media item 178 for download. The delete control 408 is used to indicate that the user 10 would like to remove the media item 178 from the presentation 160. The Twitter control 410 is used to indicate that the media item 178 should be re-tweeted. The Tumbler control 412 is used to indicate that the media item 178 should be posted to tumbler. The Facebook control 414 is used to indicate that the media item 178 should be posted to Facebook.

Referring now to FIG. 5, rendering controls 500 are shown for directing the rendering of the presentation 160. The complete rewind control 502 operates to set the current media item to the first media item in the sequence of media items 178 comprising the presentation 160. The partial rewind control 504 operates to partially rewind the presentation. The play control 506 operates to either play the presentation 160 or pause the presentation depending on the state of the control when an input is received. The icon rendered for the control is based on the current state of the control. I.e. paused vs playing. The partial forward control 508 operates to partially forward the presentation. The complete forward control 510 operates to move the current rendering position to the last media item in the sequence of media items 178 comprising the presentation 160.

In another aspect of the present disclosure, the computing device 30-N of a user 10 may join the presentation sharing system and control the display of their presentation 160 according to their own pace and preferences. In this mode of operation, the presentation, when first joined by computing device 30-N of a user 10, is shown at the current rendering position and rendering state of the display device 80. If the user 10 does not take any action, then the presentation continues according to the rendering schedule on the display device 80. If the computing device 30-N of the user 10 receives input for the user indicating a new rendering state, then the presentation at the user 10 device proceeds according to it's own schedule. The user 10 is provided with a "sync" control 356 that enables it to sync back up to the display device 80 in terms of rendering position and state which may be invoked at any time.

Figure 6B:
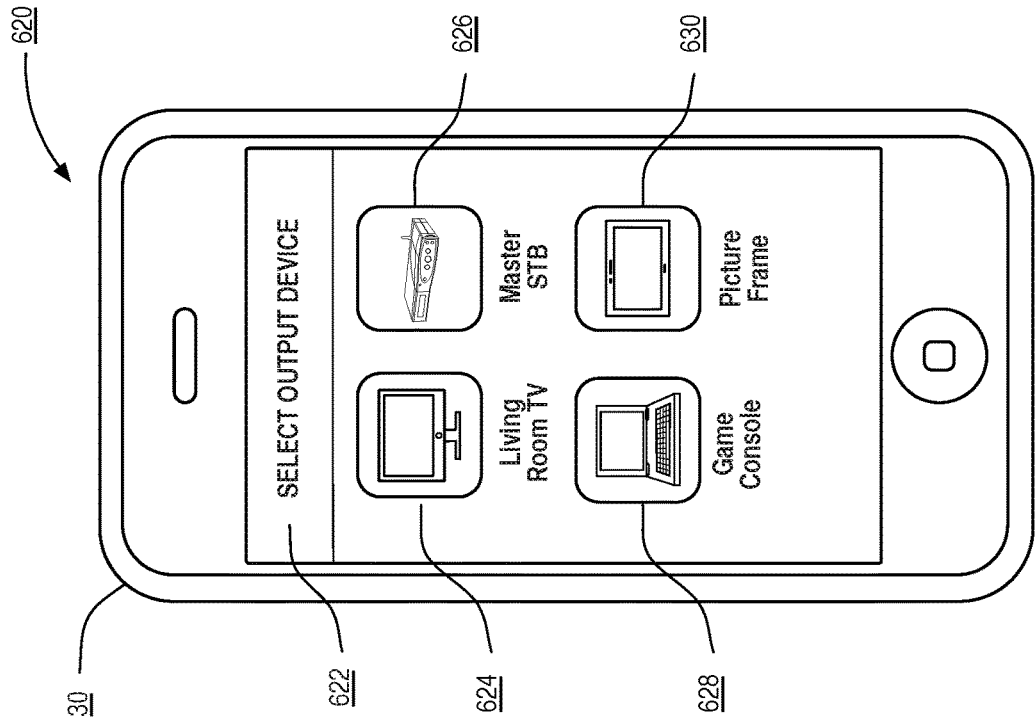
FIG. 6B illustrates an exemplary user interface of a computing device for selecting a display device for a remote presentation.
Figure 6A:
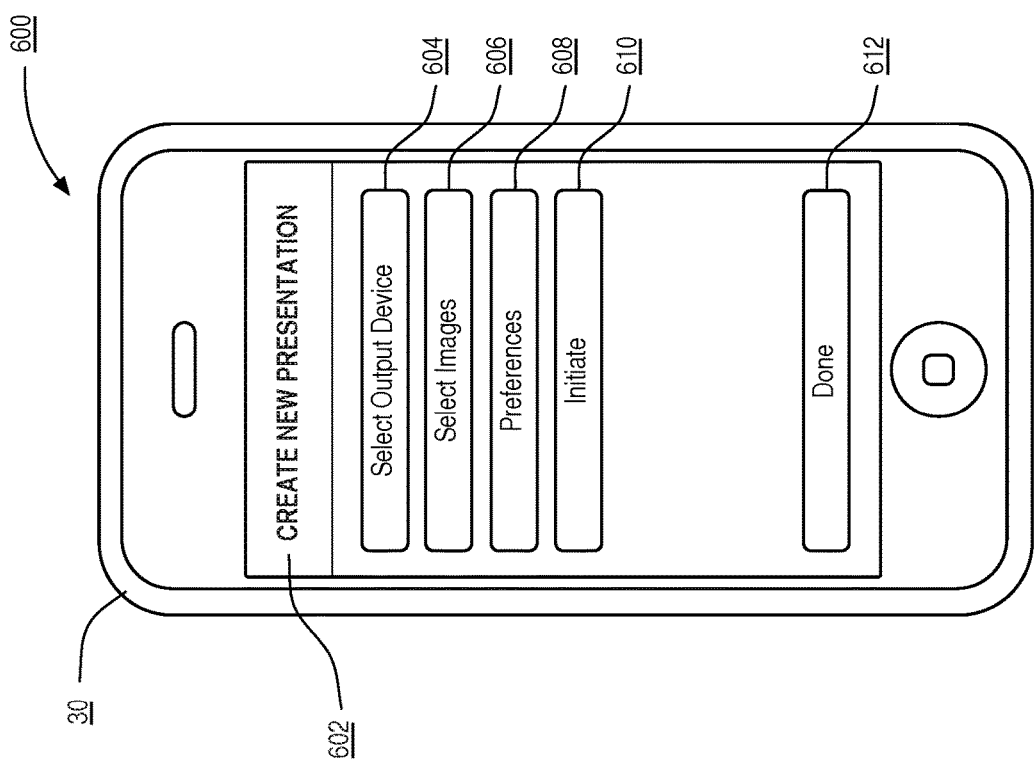
FIG. 6A illustrates an exemplary user interface of a computing device for creating a remote presentation.

FIG. 6A illustrates the user-interface 600 to create a presentation 160 on a computing device 30. The title 602 is shown at the top of the display area. The user interface operates to allow the selection of one or more output devices on which the presentation 160 will be displayed 604. The images that will be displayed in the presentation are determined 606 by a device in response to inputs received from a user. Preferences set at a device, in response to inputs received from a user, control how the remote presentation is displayed as well as how other users 10 in proximity to the remote device are allowed to interact with the presentation 608. Finally the new user 10 initiates the presentation rendering 610. In some embodiments the presentation is shown only on the display device 80. In other embodiments the presentation is shown only on the computing device 30 in which it was created. In yet other embodiments the presentation is displayed on both the computing device 30 and the display device 80 simultaneously. Control 612 may be designated when user wishes to leave complete the operation.

FIG. 6B illustrates in additional detail on computing device 30 of the selection of the display device 80 on which the presentation 160 will be displayed. A title 622 is shown at the top of the display area. One or more output devices may be designated. If no output devices are designated the presentation 160 will be shown only on the computing device 30 in which it was created. In the exemplary user interface 620, for possible display devices 80 have been detected on the local area network to which the computing device 30 is coupled. They are a TV 624, a set-top box 626, a game console 628, and a digital picture frame 630. If the number of available display devices 80 exceeds the screen area, scrolling controls (not shown in FIG. 6B) may be provided operable to enable access to additional display devices 80. In some embodiments, additional information may be displayed in proximity to the output device icons indicating their availability to act as a display device 80 for the presentation 160 rendering. For example if the TV 624 were being used by another user 10 this information may be displayed whereby the creator of the presentation 160 may choose another display device 80 that is currently idle.

Figure 6D:
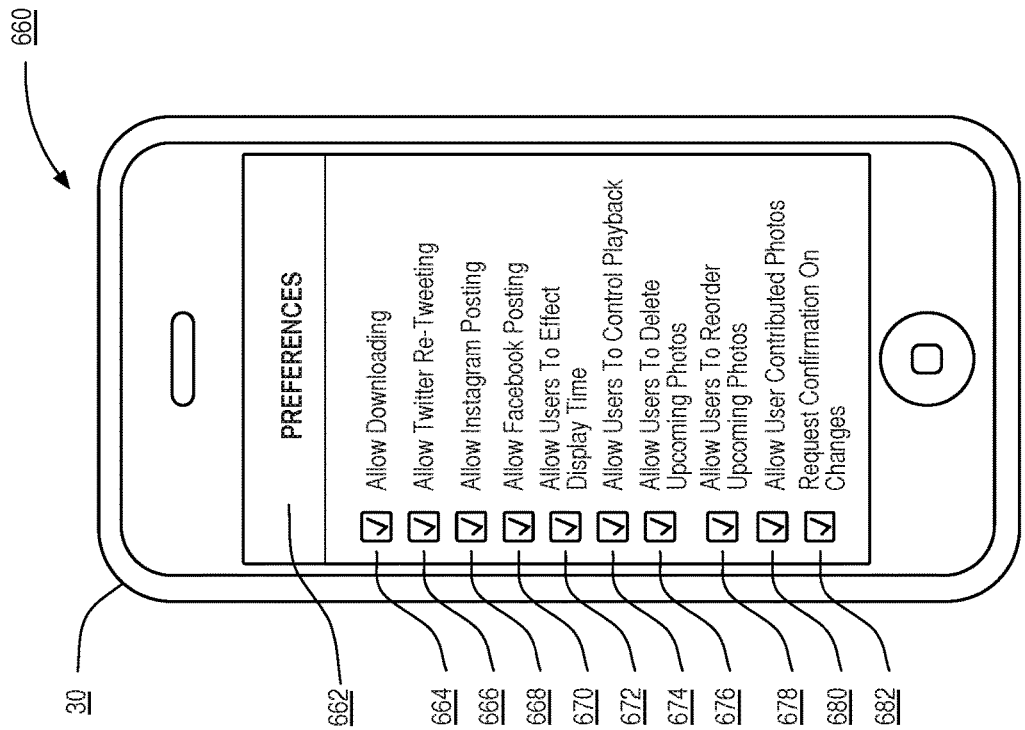
FIG. 6D illustrates an exemplary user interface of a computing device for selecting preferences for a remote presentation.
Figure 6C:
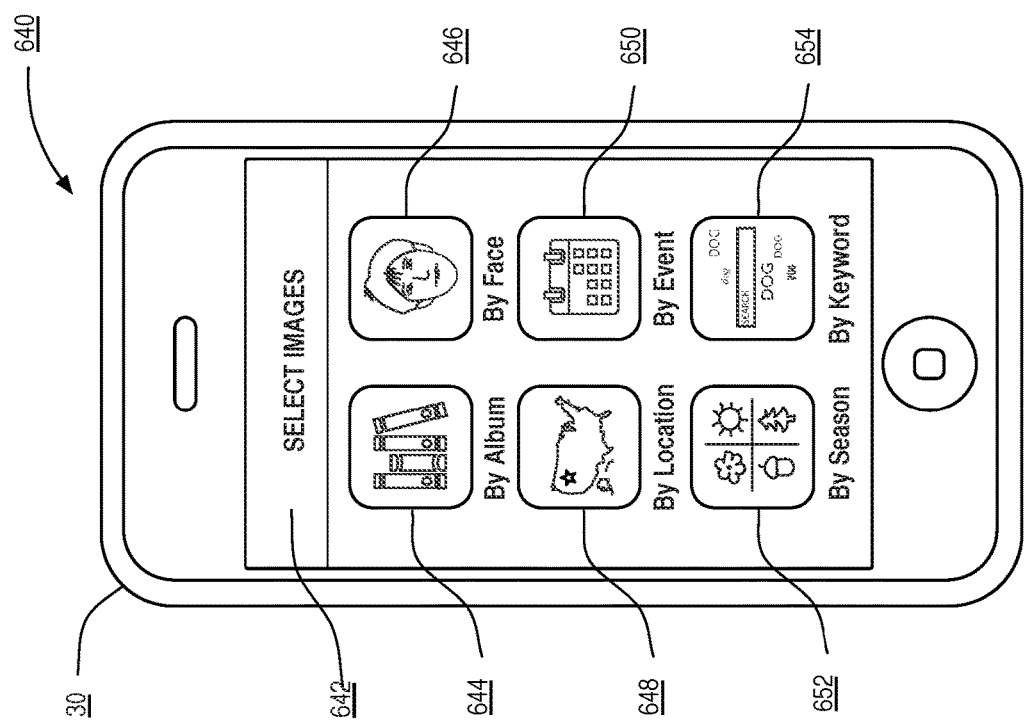
FIG. 6C illustrates an exemplary user interface of a computing device for selecting media items for a remote presentation.

FIG. 6C illustrates an exemplary user interface 640 on computing device 30 for receiving selection 642 of the media items 178 to be displayed in the presentation 160. In this instance the media items 178 to be displayed are images. The images may be designated by album 644, by face 646, by geographical location 648, by event 650, by season 652, and by keyword 654. The images may also be designated on an image by image basis (not shown). In some embodiments, the images designated for presentation 160 will reside at the computing device 30. In other embodiments, the images designated for presentation 160 will reside at an external device, such as the image server. In yet other embodiments, images will be designated from the computing device 30-1 and other computing devices 30-N.

FIG. 6D shows preferences 662 in an exemplary interface 660 on computing device 30 operable to enable the presentation creator to control how other users 10 on the local area network are able to interact with the presentation. As used herein, presentation creator refers to the user providing inputs to the device controlling the creation of a presentation 160. The download control 664 operates to allow the presentation creator to permit other presentation 160 users 10 to download images from the presentation 160. The Twitter® control 666, Instagram® control 668, and Facebook® control 670 operate respectively to allow the presentation creator to permit other presentation users 10 to tweet on Twitter®, post on Instagram®, and post on Facebook® the images from the presentation 160. Preference control 672 operates to allow the presentation creator to permit other presentation users 10 to effect display time of images. In some embodiments this is accomplished based on other users 10 interacting with "thumbs-up" and thumbs-down" controls to indicate media items that they like vs media items that they do not care for. Preference control 674 operates to allow the presentation creator to permit other presentation users 10 to control the presentation rendering or playback. Preference control 676 operates to allow the presentation creator to permit other presentation users 10 to delete upcoming media items 178 from the presentation 160. Preference control 678 operates to allow the presentation creator to permit other presentation users 10 to reorder the sequence of the upcoming media items 178 of presentation 160. Preference control 680 operates to allow the presentation creator to permit other presentation 160 users to contribute new media items 178 to the sequence of media items 178 of the presentation 160. Preference control 682 operates to allow the presentation creator to request notification whenever another user takes an action indicated by one of the other preference controls (664 through 680), and allowed to grant or deny the request on a per request basis.

Figure 7:
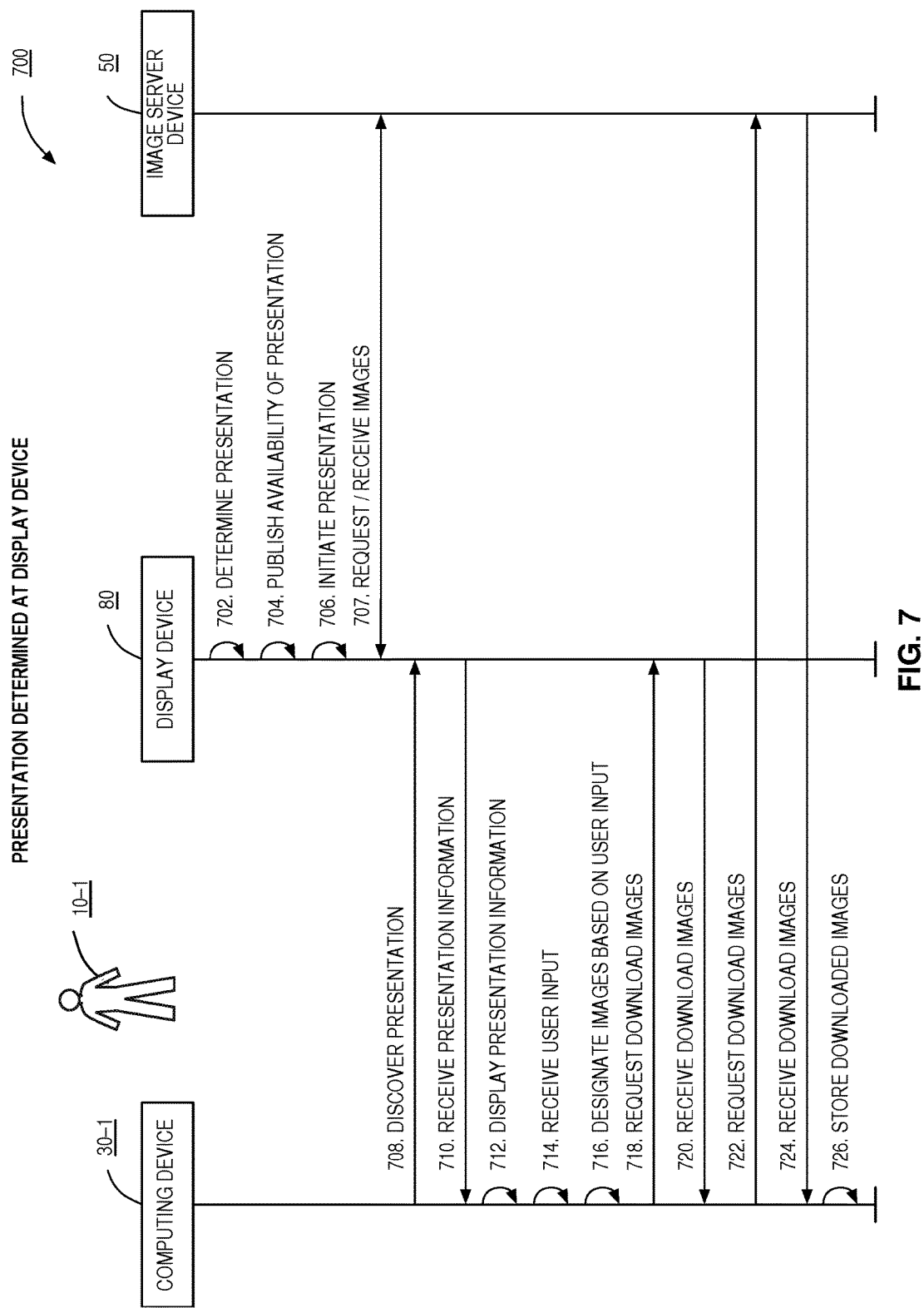
FIG. 7 illustrates a network diagram for interacting with a remote presentation wherein the presentation is determined by the display device.

Referring now to FIG. 7 a network diagram 700 is shown illustrating the network interactions between the computing device 30, display device 80, and image server device 50. In the embodiment corresponding to FIG. 7, the presentation 160 is created 702 at the display device 80. The availability of the presentation 160 is advertised 704 enabling other computing devices 30 on the LAN may discover the publishing service and join 708 the presentation 160. The presentation 160 rendering may then be initiated 706. After discovery, 708 a computing device 30 receives 710 a presentation 160. The presentation 160 comprises information such as an ordered a list of the media items 178 used in the presentation 160, the sequence in which the media items 178 are to be displayed by default, information indicating the current rendering position, and other related information. Based on preferences shown in FIG. 6D, computing devices 30 are enabled to interact with the presentation 160 while it is being rendered at the display device 80. The presentation 160 is displayed 712 at the computing device 30. In some embodiments input from user 10 is received 714 at the computing device 30. Based on the received user input, images are designated 716 by the device. The designated images are requested 718 from the display device 80. The requested images are then received 720. In other embodiments images are requested 722 from an image server 50 and received 724 from the image server 50. The received images are stored 726 at the computing device 30.

Figure 8A:
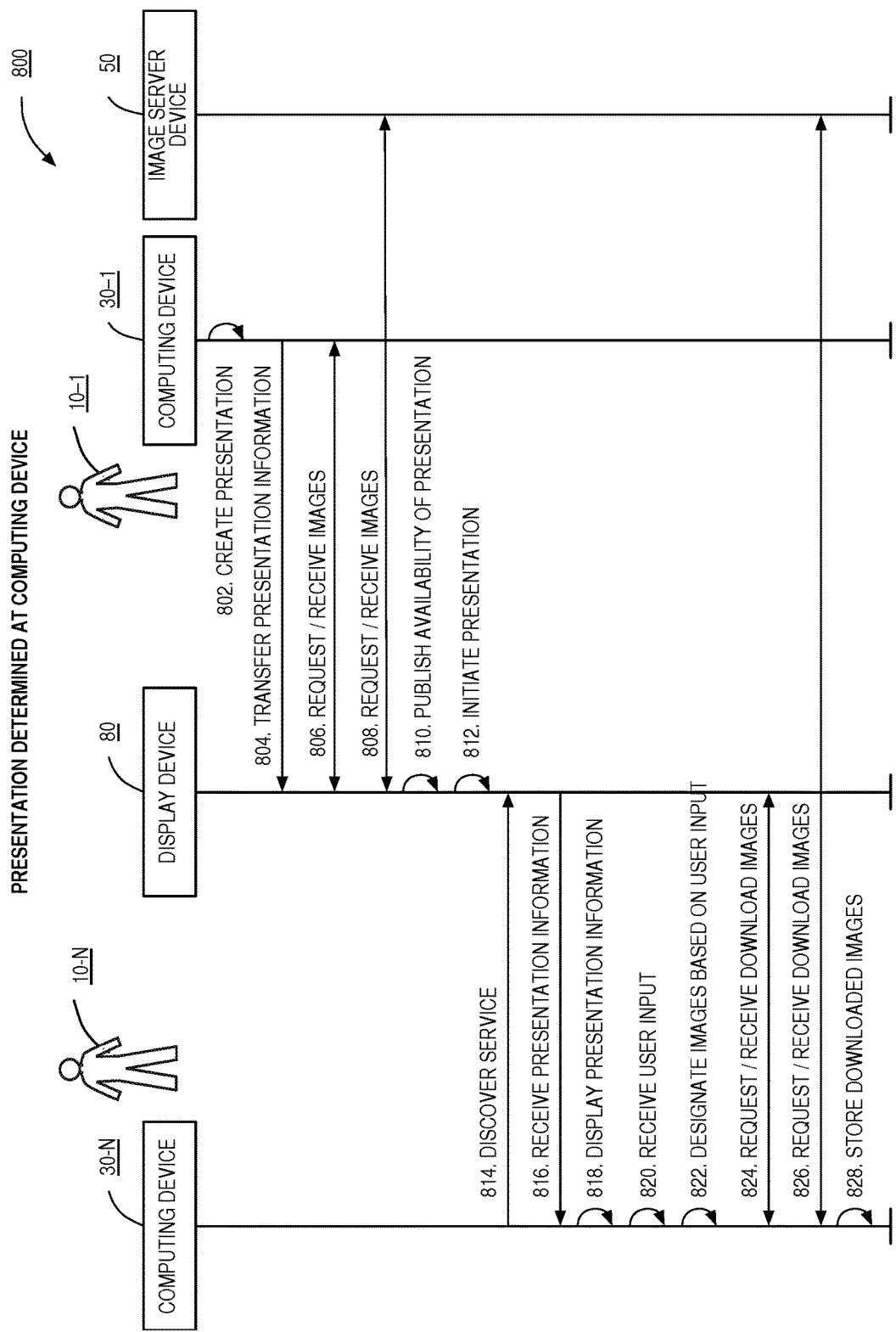
FIG. 8A illustrates a network diagram for interacting with a remote presentation wherein the presentation is determined by the computing device and provided to the display device.
Figure 8B:
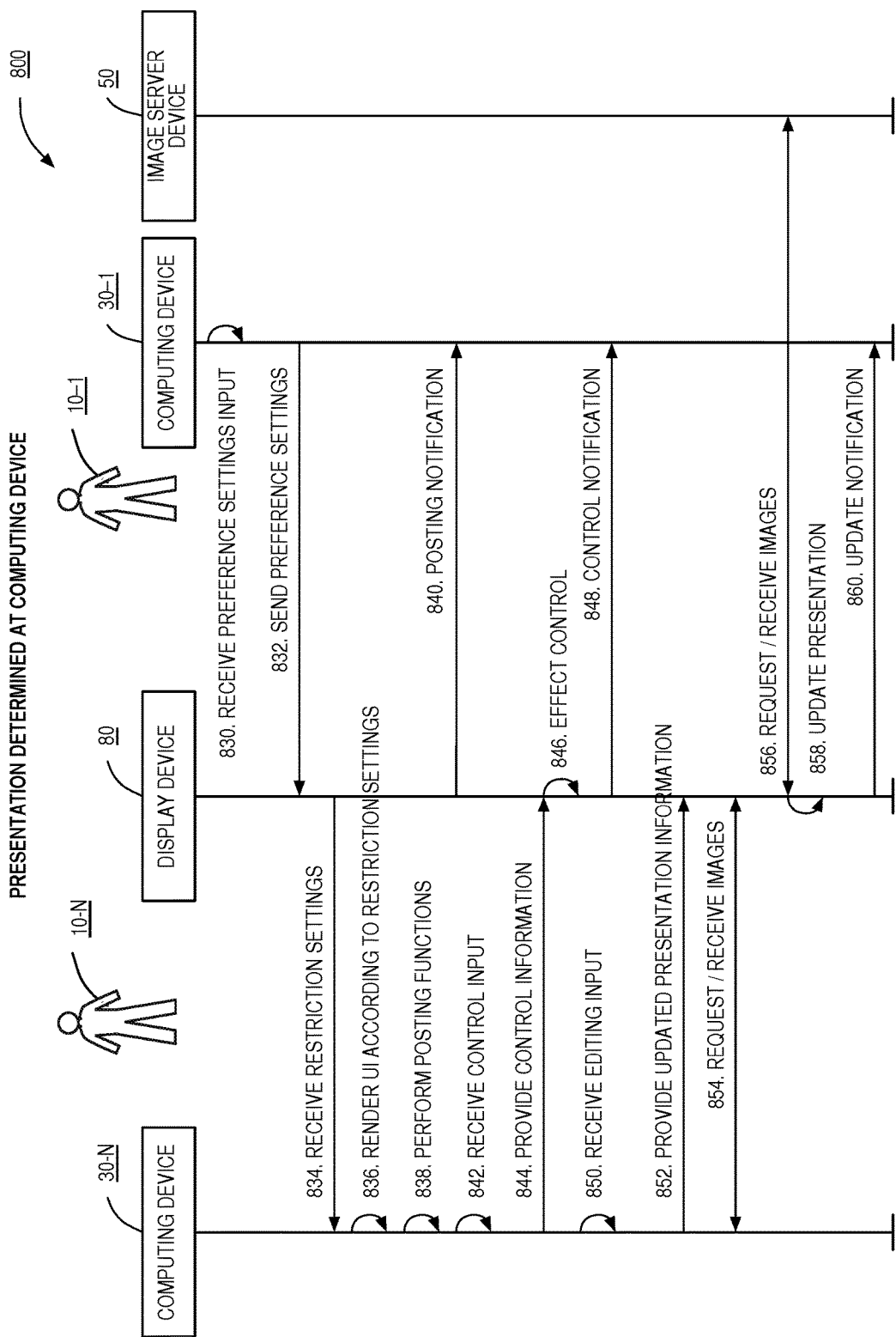
FIG. 8B illustrates a network diagram for interacting with a remote presentation wherein the presentation is created by the computing device and provided to the display device.

Referring now to FIGS. 8A and 8B, a network diagram 800 is shown illustrating the network interactions between the computing device 30-1 creating the presentation 160, display device 80, the computing device 30-N viewing the display device 80, and an image server device 50. In the embodiment corresponding to FIG. 8A, the presentation 160 is created 802 at the computing device 30-1. The presentation 160 is transferred to the display device 804. The display device 80 request and receives 806 images from the computing device 30-1 and or the image server 808. The availability of the presentation 160 is advertised 810 enabling other computing devices 30 on the LAN may discover the publishing service and join 814 the presentation 160. The presentation 160 rendering may then be initiated 812. After discovery 708 the computing device 30-N receives 816 presentation 160. The presentation 160 comprises information such as the media items 178 used in the presentation 160, the sequence in which the media items 178 will be displayed, and information indicating that the current rendering position. Based on the preference shown in FIG. 6D, the computing device 30-N is enabled to interact with the presentation 160 while it is being displayed at the display device 80. The presentation 160 is displayed 818 at the computing device 30-N. In some embodiments input from user 10-N is received 820 at the computing device 30. Based on the received user input, images are designated 822 by the device. The images for download are requested and received 824 from the display device 80 and or the image server 826. The received images are stored 828 at the computing device 30-N.

Continuing with FIG. 8B, the computing device 30-1 providing the presentation 160 may receive input from user 10-1 specifying preferences 830. The preference data is then sent 832 to the display device 80. Based on the preference settings restrictions are provided 834 to the computing devices 30-N viewing the presentations 160. The user interfaces described in FIGS. 3A and 3B are then rendered according to the restrictions, with unavailable functions being greyed out to indicate that they are disabled 836. If the restriction settings permit, the user 10-N may invoke posting modules 838, with notifications 840 being provided to the computing device 30-1 providing the presentation 160. If the restriction settings permit, the user 10-N may invoke control modules 842 and 844 effecting rendering 846 of the presentation 160 at the display device 80 with notifications 848 being provided to the computing device 30-1 providing the presentation 160. If the restriction settings permit, the user 10-N may edit 850 the presentation 160 and provide updated presentation 852 to the display device 80. If the user 10-N has added images to the presentation 160, the display device 80 may need to request and receive additional images 854 and 856. Based on the updated presentation 160, the presentation 160 is updated 858 at the display device 80. If requested, a notification is provided to the computing device 30-1 having provided the original presentation 160 information 860.

In some embodiments of the present disclosure, the display device 80 may need to cache details of presentation 160 temporarily to allow other users sufficient time to access. When the presentation 160 is created at and provided by a computing device 30-1, the presentation 160 and associated image may be provided by the computing device 30-1 or other remote source, such as the image server device 50. The images may also reside at the display device 80 itself. In the event where the images are being provided by the computing device 30-1 or remote source to the display device 80, the display device 80 may store or cache the presentation 160 and associated image data at the display device 80 so that it may be provided by the display device 80 to other users 30-N. The presentation 160 and associated image data may reside at the display device 80 until the presentation completes, until sometime after completion, until the storage space is needed for other operations, or until explicitly remove by a user of the display device 80.

Figure 9:
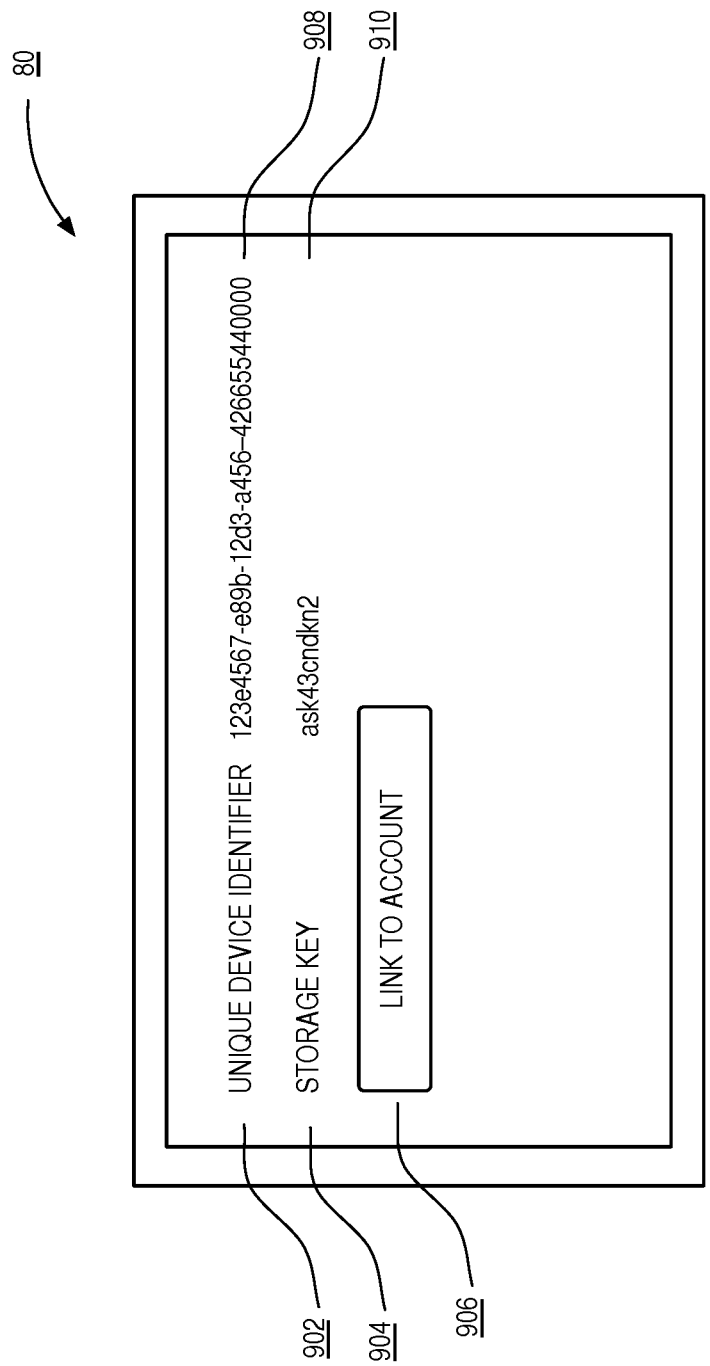
FIG. 9 illustrates an exemplary user interface of a display device for displaying access information.

Referring now to FIG. 9, a screen for an exemplary display device 80 is shown. A unique device identifier heading 902 is displayed along with the unique device identifier value 908. The unique device identifier 908 is a globally unique device identifier that is used to uniquely identify the display device 80. The unique device identifier 908 is used to organize and access data items (presentations, media items, and the like) at the image server device 50. In some embodiments, the unique device identifier 908 is a MAC address. In some embodiments, the unique device identifier 908 is generated at the device. In other embodiments, the unique device identifier 908 is received from an external server and assigned to the display device 80. In some embodiments, the unique device identifier 908 is a Universally Unique Identifier (UUID). In embodiments where the unique device identifier 908 is generated or received, the unique device identifier 908 is determined only once for a display device 80. Afterwards it is stored in non-volatile memory at the display device so that it may be retrieved across power cycles.

As used herein, MAC address (media access control address), or physical address, refers to a unique device identifier assigned to network interfaces for communications on the physical network segment. MAC addresses are used as a network address for most IEEE 802 network technologies, including Ethernet and WiFi. Logically, MAC addresses are used in the media access control protocol sublayer of the OSI reference model. MAC addresses are most often assigned by the manufacturer of a network interface controller (NIC) and are stored in its hardware, such as the card's read-only memory or some other firmware mechanism. If assigned by the manufacturer, a MAC address usually encodes the manufacturer's registered identification number and may be referred to as the burned-in address (BIA). It may also be known as an Ethernet hardware address (EHA), hardware address or physical address.

As used herein, a UUID is 16-octet (128-bit) number. In its canonical form, a UUID is represented by 32 lowercase hexadecimal digits, displayed in five groups separated by hyphens, in the form 8-4-4-4-12 for a total of 36 characters (32 alphanumeric characters and four hyphens). For example: "123e4567-e89b-12d3-a456-426655440000".

In some embodiments, the UUID may be used as an input to a salted hash function that further changes the UUID so that it would be difficult to reverse engineer. For example, in one embodiment, the UUID is generated along with a salt (taken as a random number from a hardware random number generator) and fed into a cryptographic hashing function that specifies the number of times to hash the function, say 130 times. The end result is then a salted hashed version of the UUID. If the display device 80 does not contain a hardware random number generator, then a pseudo random number generator could be used. In other embodiments, salted hashing could be done both on the display device 80 as just described, and also the image server device 50 so as to further increase the anonymity of the unique device identifier 908.

As used herein, a salt is random data that is used as an additional input to a one-way function that "hashes" a password or passphrase. Salts are closely related to the concept of nonce. The primary function of salts is to defend against dictionary attacks versus a list of password hashes and against pre-computed rainbow table attacks. A new salt is randomly generated for each password. In a typical setting, the salt and the password are concatenated and processed with a cryptographic hash function, and the resulting output (but not the original password) is stored with the salt in a database. Hashing allows for later authentication while protecting the plaintext password in the event that the authentication data store is compromised.

A storage key heading 904 is shown along with the storage key 910. In some embodiments, the storage key 910 is generated by the display device 80. For example, the storage key 910 may be derived from a true random number generator either alone or in conjunction with a crypto secure pseudo random number generator. In computing, a hardware random number generator (TRNG, True Random Number Generator) is a device that generates random numbers from a physical process, rather than a computer program. Such devices are often based on microscopic phenomena that generate low-level, statistically random "noise" signals, such as thermal noise, the photoelectric effect, involving a beam splitter, and other quantum phenomena. A cryptographically secure pseudo-random number generator (CSPRNG) or cryptographic pseudo-random number generator (CPRNG) is a pseudo-random number generator (PRNG) with properties that make it suitable for use in cryptography. A pseudorandom number generator (PRNG), also known as a deterministic random bit generator (DRBG), is an algorithm for generating a sequence of numbers whose properties approximate the properties of sequences of random numbers. In other embodiments, the key may be received from an entity external to the display device 80. In embodiments where the storage key 910 is generated or received, the storage key 910 is determined only once for a display device 80. Afterwards it is stored in non-volatile memory at the display device so that it may be retrieved across power cycles. The storage key is used to encrypt data items stored by the display device 80 at the image server device 50. The storage key 910 may be stored at the display device 80 and computing devices 30 having participated in a presentation.

In order to enable to display device 80 to store presentations and media items 178 in instances where the display device 80 does not have the requisite storage capabilities, the unique device identifier 908 and the storage key 910 are used to store the data at an external device, such as an image server device 50 connected over a wide area network (the Internet for example). Since the unique device identifier 908 is unique, the display device 80 is able to access the stored data using the unique device identifier 908 to qualify the request. The storage key 910 ensures that only the display device 80, or a computing device 30 having participated in a presentation at a display device 80, is able to access the data stored at the image server device 50. Because neither the unique device identifier 908 nor the storage key 910 are user 10 supplied, the display device 80 is able to store data at the image server device 50 without configuration. Thus a user 10 on the local area network with the display device 80, once on the network, is able to share (and store) presentations and their corresponding data item without further configuration. In some embodiments, the data stored by the display device 80 using the unique device identifier 908 and storage key 910 may be linked and/or exported to another account. The display device 80 may be operable to receive user 10 input designating the link accounts control 906. The display device 80 may then effect the display of another screen enabling the entry of account credentials for another account. This other account, may be for example, another photosharing site, social network, and the like.

The encryption of data items stored at the image server device 50 may be accomplished in a number of different processes:

TABLE 1

(1.) Send the unencrypted images to the image server over an unsecure connection, send the display device storage key to the server over a secure connection, server encrypts the images using the display device storage key and stores encrypted images (2.) Send the unencrypted images to the image server over an secure connection, send the display device storage key to the server over a secure connection, server encrypts the images using the display device storage key and stores encrypted images (3.) Encrypt the images client side with the storage key, send first encrypted images to the image server over a connection (secure or unsecure), image server generates its own storage key, encrypts the first encrypted images (to create a second encrypted image) and stores the second encrypted image. The server could store a salt that it uses to generate the storage encryption key from a deterministic value on the server that is not stored in the database. While the salt is stored in the database, because the server's deterministic value is not known, the cryptographic hashing algorithm is not known, and the number of times the value is hashed is unknown, again, security and privacy are enhanced, though not guaranteed. Further, even if the server side encryption could be reverse engineered, the display device storage key would further be required to completely decrypt the image. In this case, there would be a 1-to-1 correspondence between the server side salt and the sharing session (i.e. session identifiers).

TABLE 1-continued (4.) Encrypt the images client side with a client key, send first encrypted images to the image server over a connection (secure or unsecure), send the storage key to the image server, encrypt the image using the storage key (to create a second encrypted image) and store the encrypted image. Note, however, that in embodiments with client side encryption with a client side key, the client side keys for generating the encryption must be ultimately shared with all of the devices in the sharing session in order to allow them to be completely decrypted.

Figure 10A:
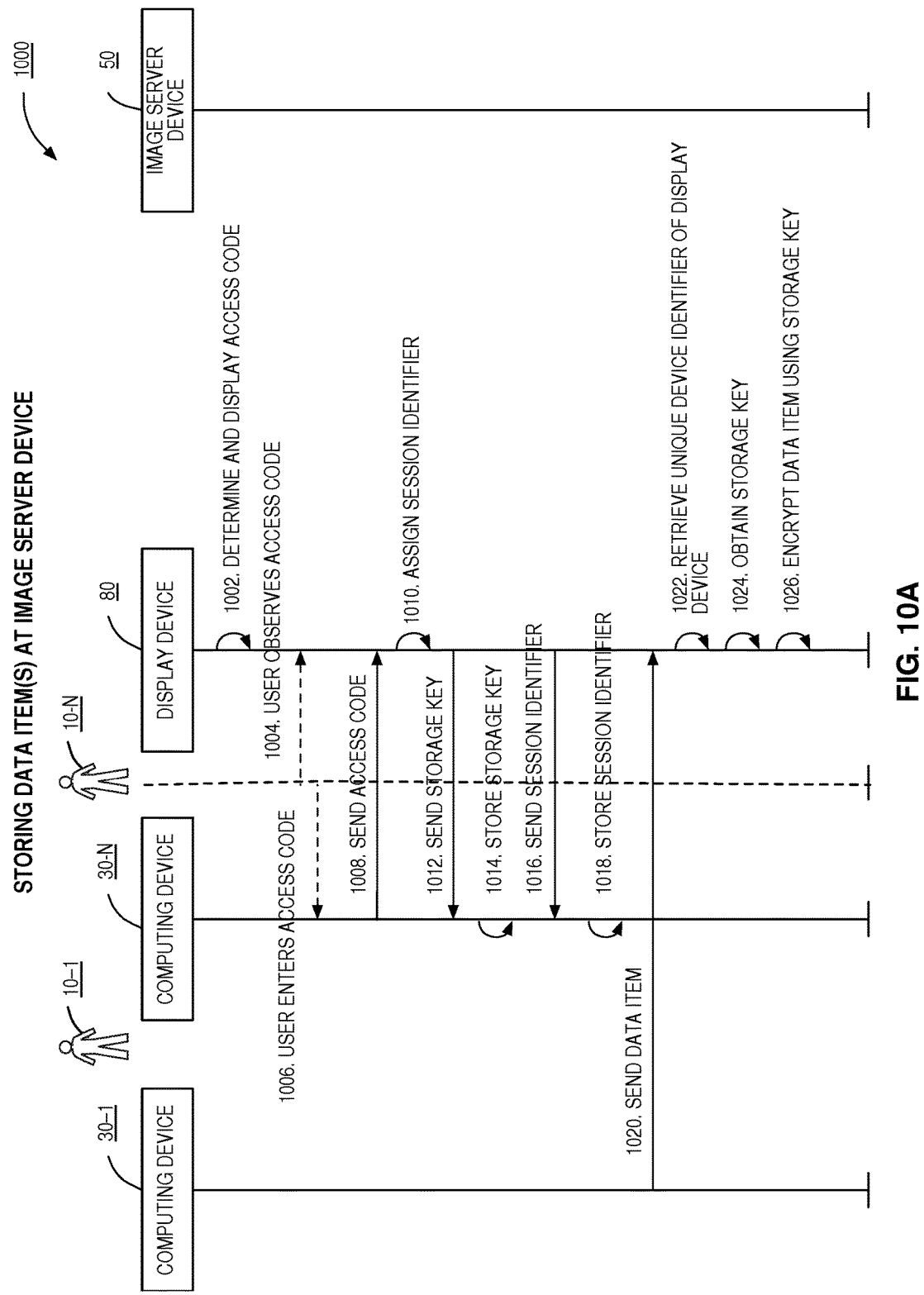
FIG. 10A illustrates a network diagram for storing a data item at an image server device without requiring user input of credentials.
Figure 10B:
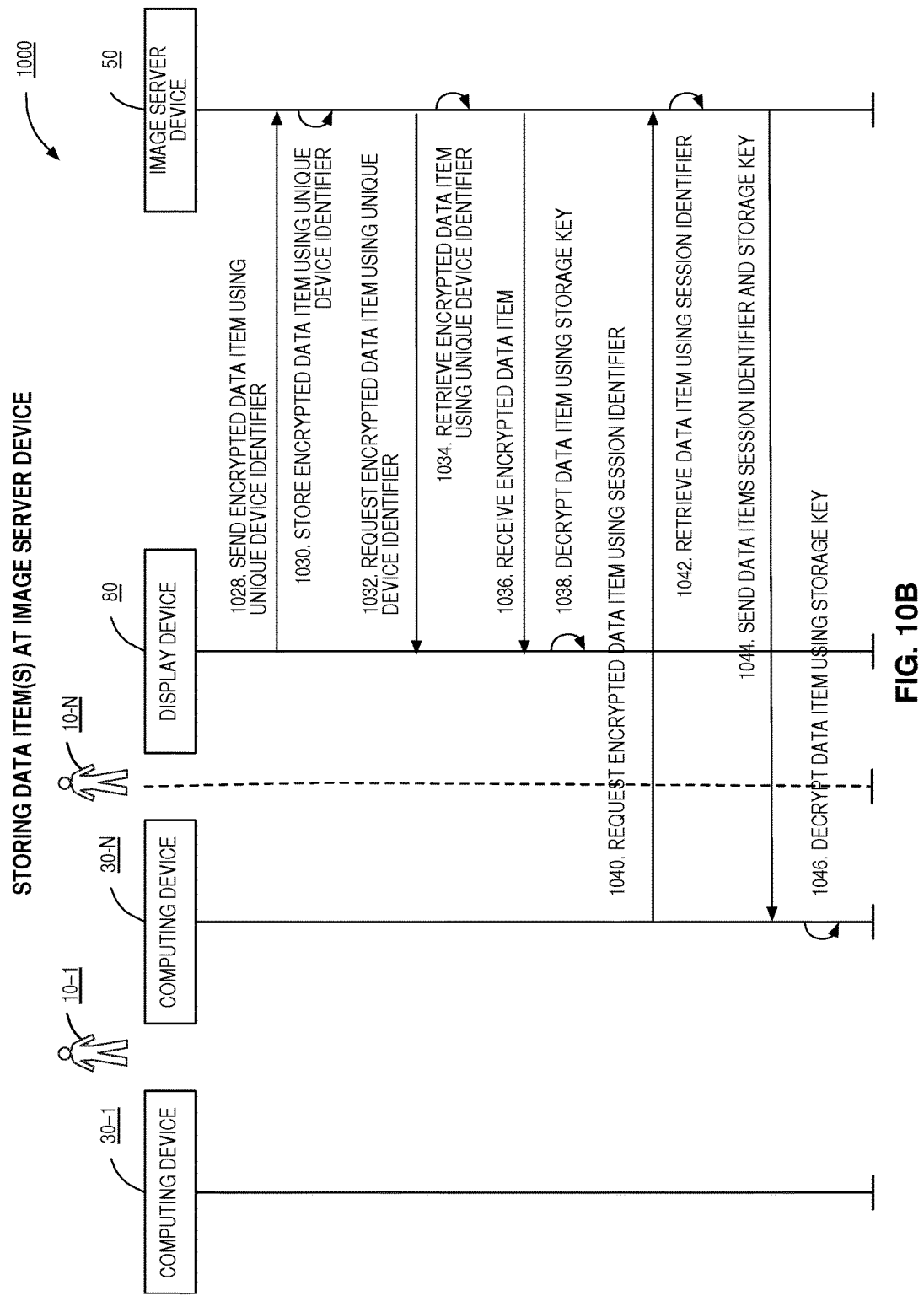
FIG. 10B illustrates a network diagram for storing a data item at an image server device without requiring user input of credentials.

Referring now to the network diagram 1000 of FIG. 10A, in some embodiments, the display device 80 determines 1002 and displays an access code 1110. The "following" user 10-N observes 1004 and enters 1006 the access code 1110 at the computing device 30-N. The computing device 30-N sends 1008 the access code 1110 to the display device 80. The display device 80 assigns 1010 a session identifier 1114 in response to receiving the access code 1110. The session identifier 1114 enables the computing device 30-N to browse all data items linked to a session. In another aspect of the present disclosure, the session identifier 1114 is assigned when a first presentation is designated, and no access code is determined or displayed. In some aspects, this may occur when no credentials are required to join a local area network, thus sharing is enabled without any entry of information by the user 10 in regards to the sharing. The display device 80 sends 1012 the storage key 910 to the computing device 30-N. The computing device 30-N stores 1014 the storage key 910. By storing the storage key at the computing device 30-N, the computing device 30-N is operable to receive and decrypt encrypted data items from the image server device 50 directly without having to go through the display device 80 (when accessing data items through the display device, the decryption is done for the computing device 30-N at the display device prior to sending the data item to the computing device 30-N). This become advantageous when the computing device 30-N is no longer connected to the display device 80 over the local area network (i.e. they have left the dwelling), but still desire access to the data item, and they have not stored the data item locally at the computing device 30-N. The display device 80 sends 1016 the session identifier 1114 to the computing device 30-N. The computing device 30-N stores 1018 the session identifier 1114. The computing device 30-1 sends 1020 to the display device 80 a data item. The data item may be, for example, presentations 160, media items 178, or any data item. However, the data item may be any type of data the display device wishes to store. The display device 80 retrieves 1022 the unique device identifier 908 for the display device 80. The display device 80 obtains 1024 the storage key 910. The display device 80 encrypts 1026 the data item using the storage key 910. Referring now to the network diagram 1000 of FIG. 10B, the display device 80 sends 1028 the encrypted data item to the image sharing server 50 along with the unique device identifier 908. The image sharing server 50 stores 1030 the encrypted data item using the unique device identifier 908. The display device 80 requests 1032 the encrypted data item using the unique device identifier 908. By linking data items to the unique device identifier 908 the display device 80 is able to browse all data items stored by the display device 80. The image sharing server 50 retrieves 1034 the encrypted data item using the unique device identifier 908, and sends 1036 the encrypted data item to the display device 80. The display device 80 decrypts 1038 encrypted data item using the storage key 910. Using the session identifier 1114, the computing device 30-N may request 1040 data items linked to a session. The image server device 50 retrieves 1042 the linked data items using the session identifier 1114, and sends 1044 them to the requesting computing device 30-N. The computing device 30-N is operable to decrypt the data items using the storage key 910.

In some embodiments, the data being sent from the display device 80 to the image server device 50 is not encrypted. Instead both the unique device identifier 908 and storage key 910 are sent to the image server device 50 in storing the data. Subsequent access to the data from the display device 80 requires the transmission of both the unique device identifier 908 and storage key 910. In this embodiment, the connection between the may be over a secure connection, using for example SSL or the like.

EXAMPLE

FIGS. 11A-11C display database organizations (schemas) for an image server device 50, three computing devices 30, and five display devices 80 according to option 3 of Table 1 above.

Referring now to FIG. 11A, note in this database that some images (5,6, and 7) were used in multiple sessions (session identifier T and session identifier Z) on different display devices (Display Device B and Display Device E). The Encrypted Image Column would actually be a link to where the encrypted file could be retrieved on the file system of the image server and not the encrypted image itself. By using links, the image server can optimize storage. For example, in some embodiments, the image server would compute a file check sum on any new images uploaded and compare to the file checksums of existing files in the database. If there is a match, the image server can use the existing image and update the links accordingly in the database. The database table 1100 is comprised of a display device ID 908, a session identifier 1114, an encrypted image 1116, and an image server salt 1118. Note that the column containing the access code 1110 is not part of the database table and is not stored at the image server device 50. It is shown here to show that a corresponding session identifier was generated and delivered to computing devices 30 in response to them sending the display device 80 the access code 1110. While, according to some embodiments, the access code 1110 is only four digits to make it easy for the user to observe and re-enter, the session identifier 1114 is chosen to have superior security properties.

Referring now to FIG. 11B, the computing device 30 database schema 1120 is comprised of session identifiers 1114 and storage keys 910. Because of the lightweight, frictionless architecture presented herein, computing devices 30 need only retain a running history of the sharing sessions in which they have participated (i.e. session identifiers 1114) and the different storage keys 910 they have retained (for decrypting images). In this manner, it is easy for them to retrieve and decrypt images from the image server device. They can also easily share these "credentials" with other services (such as online social networking sites like Facebook and Instagram) in order to easily share the images on those sharing services. The database table at each computing device is comprised of session identifiers 1114 and storage keys 910.

Referring now to FIG. 11C, the display device schema 1130 is comprised of a unique device identifier 908, a storage key 910, and zero to many session identifiers 1114.

Figure 12:
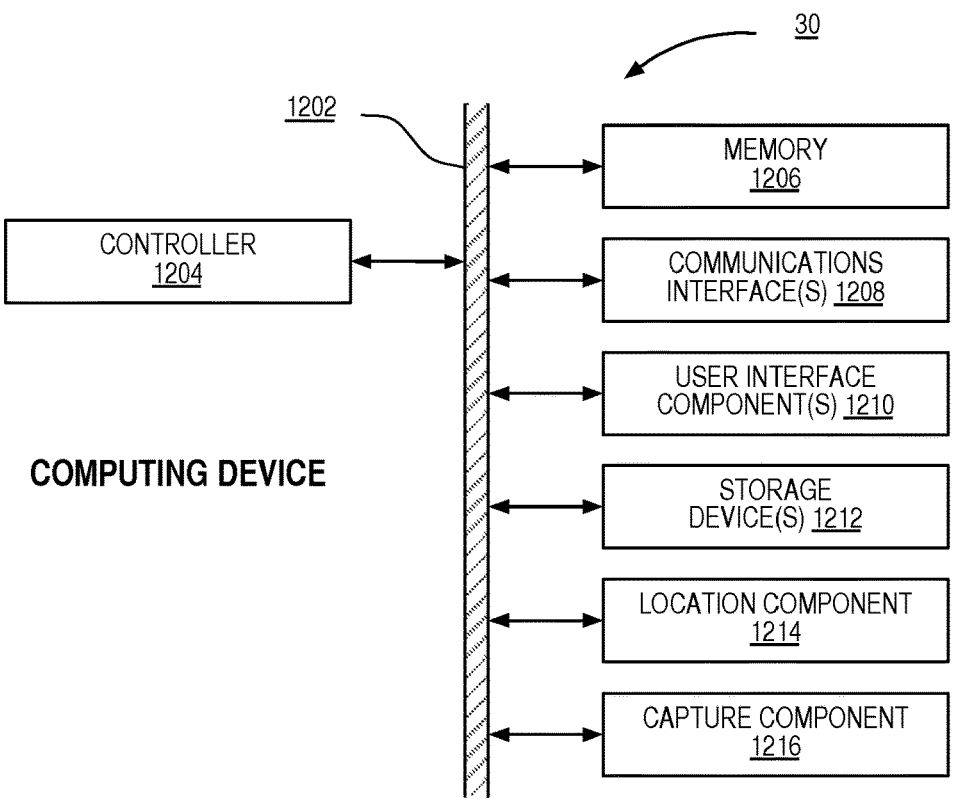
FIG. 12 is a block diagram of the computing device of FIG. 1 according to one aspect of the present disclosure.

FIG. 12 is a block diagram of a computing device 30 (e.g., one or more computing devices 30 of FIG. 1) according to one embodiment of the present disclosure. As illustrated, the computing device 30 includes a controller 1204 connected to memory 1206, one or more communications interfaces 1208, one or more user interface components 1210, one or more storage devices 1212, a location component 1214, and an image capture component 1216 by a bus 1202 or similar mechanism. The controller 1204 is a microprocessor, digital ASIC, FPGA, or the like. In general, the computing device 30 includes a control system 32 having associated memory 1206. In this embodiment, the controller 1204 is a microprocessor, and the browsing module 36, notification engine 38, upload module 42, and UI module 34 are implemented in software and stored in the memory 1206 for execution by the controller 1204. However, the present disclosure is not limited thereto. The aforementioned modules and engine may be implemented in software, hardware, or a combination thereof. The computing device 30 also includes a communication interface 1208 enabling the computing device 30 to connect to the network 20 (FIG. 1). The one or more user interface components 1210 include, for example, a touchscreen, a display, one or more user input components (e.g., a keypad), a speaker, or the like, or any combination thereof. The storage device(s) 1212 is a non-volatile memory used to store user account repository 70, the image repository 100, and the like. In this embodiment, the location component 1214 is a hardware component, such as a GPS receiver. However, the present invention is not limited thereto. The location module 44 may be implemented in software, hardware, or a combination thereof. In this embodiment, the image capture component 1216 is comprised of a lens arrangement, color filter array (CFA), CCD or CMOS image sensor, and an analog to digital convertor (ADC).

Figure 13:
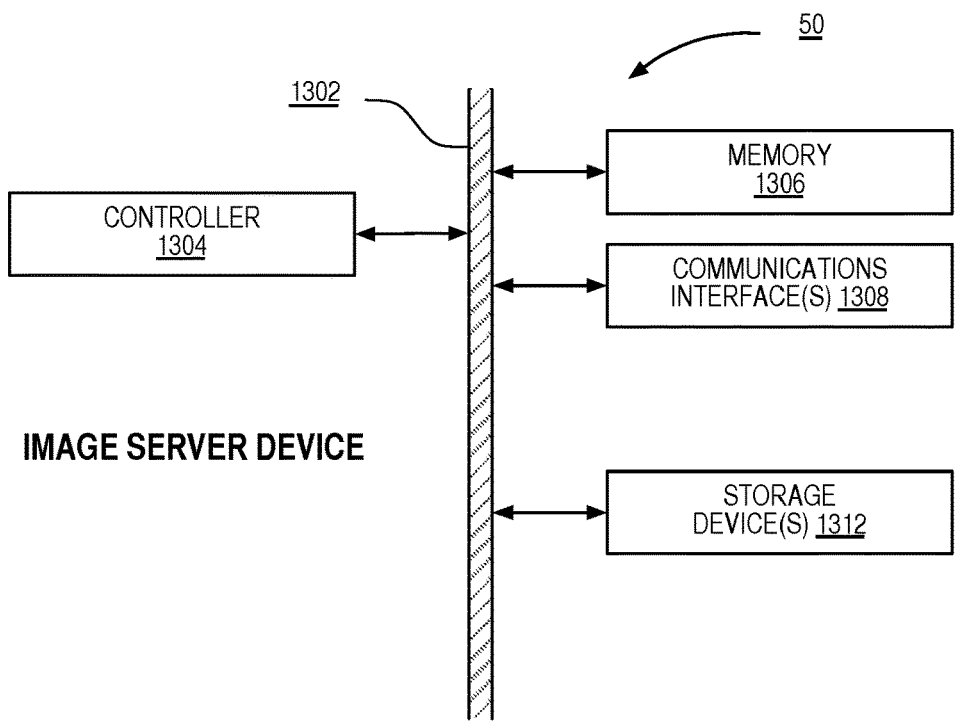
FIG. 13 is a block diagram of the image server device of FIG. 1 according to one aspect of the present disclosure.

FIG. 13 is a block diagram of an image server device 50 of FIG. 1 according to an embodiment of the present disclosure. As illustrated, image server device 50 includes a controller 1304 connected to a memory 1306, one or more secondary storage devices 1312, and one or more communications interfaces 1308 by a bus 1302 or similar mechanism. The controller 1304 is a microprocessor, digital Application Specific Integrated Circuit ASIC, Field Programmable Gate Array FPGA, or the like. In general, the image server device 50 includes a control system 82 having associated memory 1306. In this embodiment, the controller 1304 is a microprocessor, and the imaging engine 60 is implemented in software and stored in the memory 1306 for execution by the controller 1304. However, the present disclosure is not limited thereto. The aforementioned modules and engine may be implemented in software, hardware, or a combination thereof. Further, the user account repository 70 and the image repository 100 may be stored in the one or more secondary storage devices 1312. The secondary storage devices 1312 are digital data storage devices such as, for example, one or more hard disk drives. The image server device 50 also includes a communication interface 1308 enabling the image server device 50 to connect to the network 20 (FIG. 1).

Figure 14:
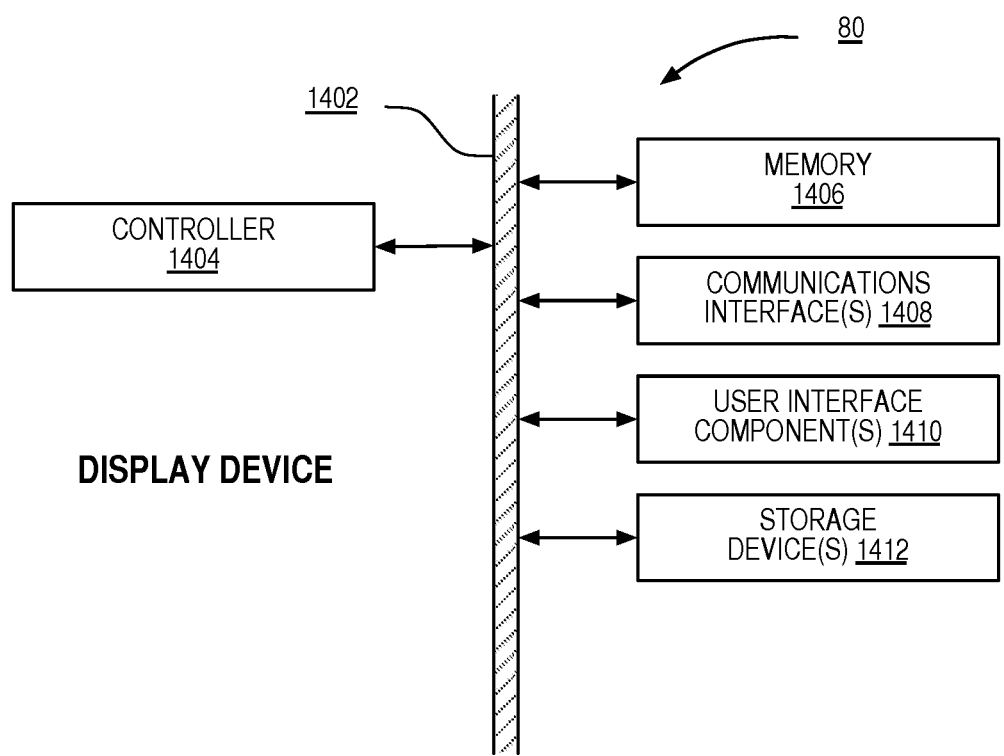
FIG. 14 is a block diagram of the display device of FIG. 1 according to one aspect of the present disclosure.

FIG. 14 is a block diagram of a display device 80 according to one embodiment of the present disclosure. As illustrated, the display device 80 includes a controller 1404 connected to memory 1406, one or more communications interfaces 1408, one or more user interface components 1410, one or more storage devices 1412 by a bus 1402 or similar mechanism. The controller 1404 is a microprocessor, digital ASIC, FPGA, or the like. In general, the display device 80 includes a control system 82 having associated memory 1306. In this embodiment, the controller 1404 is a microprocessor, and the presentation rendering module 88 is implemented in software and stored in the memory 1406 for execution by the controller 1404. However, the present disclosure is not limited thereto. The presentation rendering module 88 may be implemented in software, hardware, or a combination thereof. The display device 80 also includes a communication interface 1408 enabling the reference display device 80 to connect to the network 20 (FIG. 1A). The one or more user interface components 1410 include, for example, a touchscreen, a display, one or more user input components (e.g., a keypad), a speaker, or the like, or any combination thereof. The storage device(s) 1412 is a non-volatile memory. Some display devices 80 will have no or limited memory for storing content. For example, OTT devices such as the Google Chromecast. In this situation, the storage provided by the image server device 50 will be the only permanent storage for content. Other display devices 80, such as DVR's, may have significant content storage. In this case, the image server device 50 will provide additional storage for content.

Those skilled in the art will recognize improvements and modifications to the embodiments of the present disclosure. All such improvements and modifications are considered within the scope of the concepts disclosed herein and the claims that follow.

What is claimed is:

1. A first device comprising:
   a communications interface operable to:
      couple the first device to a second device and a third device over a local area network; and
      couple the first device and a fourth device over a wide area network; and
   a processor and a memory associated with the communications interface and operable to:
      store, at the fourth device, a plurality of presentations received at the first device;
      publish, on the local area network, availability information, the availability information enabling access to information identifying the plurality of presentations;
      based on a command received from the second device, initiate rendering from the fourth device of a designated presentation of the plurality of presentations;
      receive, from the third device, a request to control the rendering of the designated presentation; and
      effect, at the third device, based on permission received from the second device, rendering control of the designated presentation.

2. The first device of claim 1 wherein operations are performed without requiring reception of account credentials from the second device or third device for the first device or fourth device.

3. The first device of claim 1 wherein
   the first device is a display device selected from the group consisting of a television, set-top-box, over-the-top device, game console, and personal computer, and
   the second device and the third device are computing devices selected from the group consisting of a mobile phone, personal computer, and tablet computer.

4. The first device of claim 1 wherein the designated presentation is comprised of:
   an ordered list of one or more media item identifiers,
   a presentation name,
   a presentation cover,
   a presentation identifier, and
   a presentation current position.

5. The first device of claim 4 wherein the media item identifiers are one or more of:
   image identifiers,
   video identifiers, and
   audio identifiers.

6. The first device of claim 1 wherein to store the designated presentation to the fourth device the processor and the memory are further operable to:
   request, from the second device, media items identified by the designated presentation;
   receive, from the second device, the media items; and
   send, to the fourth device, the media items.

7. The first device of claim 1 wherein to store the designated presentation to the fourth device the processor and the memory are further operable to:
   determine a unique device identifier; and
   send, to the fourth device with the designated presentation, the unique device identifier.

8. The first device of claim 7 wherein the processor and the memory are further operable to:
   send, to the fourth device, the unique device identifier; and
   receive, from the fourth device, based on the unique device identifier, a listing of all presentations stored at the fourth device and linked to the unique device identifier.

9. The first device of claim 1 wherein to store the designated presentation to the fourth device the processor and the memory are further operable to:
   determine a storage key;
   encrypt, using the storage key and, prior to sending to the fourth device, the designated presentation to produce an encrypted presentation; and
   send, to the fourth device, without sending the storage key, the encrypted presentation.

10. The first device of claim 9 wherein the processor and the memory are further operable to:
    receive from the fourth device, the encrypted presentation; and
    decrypt, using the storage key, the encrypted presentation.

11. The first device of claim 9 wherein the processor and the memory are further operable to:
    receive, from the fourth device, an identifier assigned by the fourth device to the designated presentation; and
    send, to the fourth device, the identifier assigned by the fourth device to the designated presentation.

12. The first device of claim 9 wherein the processor and the memory are further operable to:
    receive the designated presentation from the first device comprises:
    receive a presentation list comprising a plurality of media item identifiers; and
    receive a plurality of media items identified by the plurality of media item identifiers.

13. The first device of claim 1 wherein the processor and the memory are further operable to:
    determine that a sharing session has started;
    assign a session identifier to the sharing session;
    link, using linking information, one or more presentations of the plurality of presentations viewed during the sharing session to the session identifier; and
    send the session identifier and the linking information to the fourth device.

14. The first device of claim 13 wherein to determine that the sharing session has started, the processor and the memory are further operable to:

determine an access code;
present on a display coupled to the first device, the access code; and
receive from the third device, the access code.

15. The first device of claim 13 wherein the processor and the memory are further operable to:
send the session identifier to the fourth device; and
receive from the fourth device, in response to sending the session identifier, information identifying the plurality of presentations viewed during the sharing session.

16. The first device of claim 15 wherein the processor and the memory are further operable to:
send, to the third device, a storage key.

17. The first device of claim 1 wherein the information identifying the plurality of presentations is one or more of alphanumeric names and cover information.

18. The first device of claim 1 wherein to initiate rendering of the designated presentation the processor and the memory are further operable to:
receive, from the third device, a second command modifying rendering;
apply the second command; and
effect, at the second device, presentation of the designated presentation.

19. The first device of claim 1 wherein to publish availability information the processor and the memory are further operable to:
receive, from the third device, a second request for the designated presentation; and
send, to the third device, one or more media item identifiers identifying a corresponding one or more media items.

20. The first device of claim 19 wherein the processor and the memory are further operable to:
receive, from the third device, a third request for one or more media items corresponding to the one or more media item identifiers; and
send, to the third device, the one or more media items.

21. The first device of claim 19 wherein the processor and the memory are further operable to:
receive, from the third device, a third request for at least a portion of a designated media item identified by the one or more media item identifiers;
receive, from the second device, the portion of the designated media item;
store, at the first device, the portion of the designated media item at the first device; and
sending, to the third device, the portion of the designated media item.

22. The first device of claim 1 wherein the processor and the memory are further operable to:
receive, from the third device, a second request to delete a designated media item from the designated presentation.

23. The first device of claim 1 wherein the processor and the memory are further operable to:
receive, from the third device, a second request to reorder media items in the designated presentation.

24. The first device of claim 1 wherein the processor and the memory are further operable to:
receive, from the third device, a second request to modify the designated presentation;
modify the designated presentation to produce a modified presentation; and
store the modified presentation.

25. The first device of claim 1 wherein the processor and the memory are further operable to:

receive, from the third device, a second request to add a media item to the designated presentation to produce a modified presentation.

26. The first device of claim 25 wherein to publish availability information the processor and the memory are further operable to:
store the modified presentation at the first device.

27. The first device of claim 25 wherein to store the modified presentation the processor and the memory are further operable to:
store the modified presentation at the fourth device.

28. The first device of claim 1 wherein to initiate rendering of the designated presentation the processor and the memory are further operable to:
present in a first area of a display coupled to the first device a current media item; and
present in a second area of the display, one or more related media items, wherein the related media items are not included in the designated presentation.

29. The first device of claim 28 wherein the processor and the memory are further operable to:
receive the one or more related media items from one or more of the second device and the third device.

30. The first device of claim 29 wherein the one or more related media items are one or more related images, and the one or more related images are related based on one or more factors chosen from a group consisting of: a subject face, an event, a geographical location, a time of capture, a location of capture, a person having captured a currently displayed image, and a device providing a currently displayed image.

31. The first device of claim 1 wherein the processor and the memory are further operable to:
receive account credentials for a fifth device; and
effect transfer of one or more media items to the fifth device,
wherein the fifth device is one of a photosharing site and a social networking site.

32. A method of operating a first device comprising:
receiving, at the first device, a plurality of presentations, the first device coupled to a second device and a third device over a local area network, and a fourth device over a wide area network;
store, at the fourth device, the plurality of presentations;
based on a command received from the second device, initiate rendering from the fourth device of a designated presentation of the plurality of presentations;
receive, from the third device, a request to control the rendering of the designated presentation; and
effect, at the third device, based on permission received from the second device, rendering control of the designated presentation.

33. A non-transitory computer readable medium storing program codes operable to instruct a processor in a first device to:
receive, at the first device, a plurality of presentations, the first device coupled to a second device and a third device over a local area network, and a fourth device over a wide area network;
store, at the fourth device, the plurality of presentations;
based on a command received from the second device, initiate rendering from the fourth device of a designated presentation of the plurality of presentations;
receive, from the third device, a request to control the rendering of the designated presentation; and effect, at the third device, based on permission received from the second device, rendering control of the designated presentation.

\* \* \* \* \*